US012706101B2

(12) United States Patent
Bruhn et al.

(10) Patent No.: US 12,706,101 B2
(45) Date of Patent: Aug. 11, 2026

(54) ROTATION OF SOUND COMPONENTS FOR ORIENTATION-DEPENDENT CODING SCHEMES

(71) Applicants: Dolby Laboratories Licensing Corporation, San Francisco, CA (US); DOLBY INTERNATIONAL AB, Dublin (IE)

(72) Inventors: Stefan Bruhn, Sollentuna (SE); Harald Mundt, Fürth (DE); David S. Mcgrath, Rose Bay (AU); Stefanie Brown, Lewisham (AU)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 461 days.

(21) Appl. No.: 18/255,232

(22) PCT Filed: Dec. 2, 2021

(86) PCT No.: PCT/US2021/061549
§ 371 (c)(1),
(2) Date: May 31, 2023

(87) PCT Pub. No.: WO2022/120011
PCT Pub. Date: Jun. 9, 2022

(65) Prior Publication Data

US 2024/0013793 A1 Jan. 11, 2024

Related U.S. Application Data

(60) Provisional application No. 63/264,489, filed on Nov. 23, 2021, provisional application No. 63/171,222,
(Continued)

(51) Int. Cl.
*G10L 19/008* (2013.01)
*G10L 19/002* (2013.01)
*G10L 19/032* (2013.01)

(52) U.S. Cl.
CPC .......... *G10L 19/008* (2013.01); *G10L 19/002* (2013.01); *G10L 19/032* (2013.01)

(58) Field of Classification Search
CPC .... G10L 19/008; G10L 19/002; G10L 19/032
See application file for complete search history.

(56) References Cited

U.S. PATENT DOCUMENTS 5,671,287 A 9/1997 Gerzon
9,384,741 B2 7/2016 Morrell
(Continued)

FOREIGN PATENT DOCUMENTS

EP 3204942 B1 9/2020
WO 2014044812 A1 3/2014
(Continued)

OTHER PUBLICATIONS

Mcgrath, D. et al "Immersive Audio Coding for Virtual Reality Using a Metadata-assisted Extension of the 3GPP EVS Codec" IEEE International Conference on Acoustics, Speech and Signal Processing (ICASSP), May 12-17, 2019, pp. 730-734, 5 pages.
(Continued)

*Primary Examiner* — Richemond Dorvil
*Assistant Examiner* — Ethan Daniel Kim

(57) ABSTRACT

Method for encoding scene-based audio is provided. In some implementations, the method involves determining, by an encoder, a spatial direction of a dominant sound component in a frame of an input audio signal. In some implementations, the method involves determining rotation parameters based on the determined spatial direction and a direction preference of a coding scheme to be used to encode
(Continued)

the input audio signal. In some implementations, the method involves rotating sound components of the frame based on the rotation parameters such that, after being rotated, the dominant sound component has a spatial direction that aligns with the direction preference of the coding scheme. In some implementations, the method involves encoding the rotated sound components of the frame of the input audio signal using the coding scheme in connection with an indication of the rotation parameters or an indication of the spatial direction of the dominant sound component.

21 Claims, 14 Drawing Sheets

Related U.S. Application Data filed on Apr. 6, 2021, provisional application No. 63/120,617, filed on Dec. 2, 2020.

(56) References Cited

U.S. PATENT DOCUMENTS

| | | | | |
|---|---|---|---|---|
| 9,460,729 | B2 | 10/2016 | Dickins | |
| 9,495,970 | B2 | 11/2016 | Dickins | |
| 9,502,046 | B2 | 11/2016 | Purnhagen | |
| 9,830,918 | B2 | 11/2017 | Purnhagen | |
| 9,973,874 | B2 | 5/2018 | Stein | |
| 10,251,012 | B2 | 4/2019 | Schaefer | |
| 10,499,176 | B2 | 12/2019 | Sen | |
| 11,699,451 | B2 | 7/2023 | Mcgrath | |
| 2013/0016842 | A1 | 1/2013 | Schultz-Amling | |
| 2015/0078556 | A1 * | 3/2015 | Shenoy | H04R 29/00 381/56 |
| 2015/0127354 | A1 | 5/2015 | Peters | |
| 2015/0356978 | A1 | 12/2015 | Dickins | |
| 2016/0345092 | A1 | 11/2016 | Virolainen | |
| 2017/0245055 | A1 | 8/2017 | Sun | |
| 2019/0069110 | A1 | 2/2019 | Gorzel | |
| 2020/0020344 | A1 | 1/2020 | Wuebbolt | |
| 2020/0068336 | A1 | 2/2020 | Honma | |
| 2020/0154229 | A1 | 5/2020 | Habets | |
| 2020/0183964 | A1 | 6/2020 | Wu | |
| 2022/0167110 | A1 * | 5/2022 | Lehtiniemi | G10K 11/17823 |
| 2022/0386056 | A1 * | 12/2022 | Vasilache | H04S 3/008 |

FOREIGN PATENT DOCUMENTS

| | | | |
|---|---|---|---|
| WO | 2014046916 | A1 | 3/2014 |
| WO | 2014046923 | A1 | 3/2014 |
| WO | 2020010072 | A1 | 1/2020 |
| WO | 2020177981 | A1 | 9/2020 |

OTHER PUBLICATIONS

Pulkki, V. et al "Parametric Time-Frequency Domain Spatial Audio" IEEE Wiley Press, 1st edition published by John Wiley & Sons, published Oct. 11, 2018, (Book Abstract, pp. 1-2, 2 pages.).

* cited by examiner

ROTATION OF SOUND COMPONENTS FOR ORIENTATION-DEPENDENT CODING SCHEMES

CROSS-REFERENCE TO RELATED APPLICATIONS

This application is a U.S. National Stage application under U.S.C. 371 of International Application No. PCT/US2021/061549, filed on Dec. 2, 2021, which claims the benefit of priority to U.S. Provisional Patent Application No. 63/264,489, filed Nov. 23, 2021, U.S. Provisional Patent Application No. 63/171,222, filed Apr. 6, 2021, and U.S. Provisional Patent Application No. 63/120,617, filed Dec. 2, 2020, all of which are incorporated herein by reference.

TECHNICAL FIELD

This disclosure pertains to systems, methods, and media for rotation of sound components for orientation-dependent coding schemes.

BACKGROUND

Coding techniques for scene-based audio may rely on downmixing paradigms that are orientation-dependent. For example, a scene-based audio signal that includes W, X, Y, and Z components (e.g., for three-dimensional sound localization) may be downmixed such that only a subset of the components of the components are waveform encoded, and the remaining components are parametrically encoded and reconstructed by a decoder of a receiver device. This may result in a degradation in audio sound quality.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

At least some aspects of the present disclosure may be implemented via methods. Some methods may involve determining, by an encoder, a spatial direction of a dominant sound component in a frame of an input audio signal. Some methods may involve determining, by the encoder, rotation parameters based on the determined spatial direction and a direction preference of a coding scheme to be used to encode the input audio signal. Some methods may involve rotating sound components of the frame of the input audio signal based on the rotation parameters such that, after being rotated, the dominant sound component has a spatial direction that aligns with the direction preference of the coding scheme. Some methods may involve encoding the rotated sound components of the frame of the input audio signal using the coding scheme in connection with an indication of the rotation parameters or an indication of the spatial direction of the dominant sound component.

In some examples, rotating the sound components comprises: determining a first rotation amount and optionally a second rotation amount for the sound components based on the spatial direction of the dominant sound component and the direction preference of the coding scheme; and rotating the sound components around a first axis by the first rotation amount and optionally around a second axis by said optional second rotation amount such that the sound components, after rotation, are aligned with a third axis corresponding to the direction preference of the coding scheme. In some examples, the first rotation amount is an azimuthal rotation amount and the optional second rotation amount is an elevational rotation amount. In some examples, the first axis or the second axis is perpendicular to a vector associated with the dominant sound component. In some examples, the first axis or the second axis perpendicular to the third axis.

In some examples, some methods may involve determining whether to determine the rotation parameters based at least in part on a determination of a strength of the spatial direction of the dominant sound component, wherein determining the rotation parameters is responsive to determining that the strength of the spatial direction of the dominant sound component exceeds a predetermined threshold.

In some examples, some methods may involve: determining, for a second frame, a spatial direction of a dominant sound component in the second frame of the input audio signal; determining that a strength of the spatial direction of the dominant sound component in the second frame is below a predetermined threshold; and responsive to determining that the strength of the spatial direction of the dominant sound component in the second frame is below a predetermined threshold, determining that rotation parameters for the second frame are not to be determined. In some examples, the rotation parameters for the second frame are set to the rotation parameters for a preceding frame. In some examples, the sound components of the second frame are not rotated.

In some examples, determining the rotation parameters comprises smoothing at least one of: the determined spatial direction of the frame with a determined spatial direction of a previous frame or the determined rotation parameters of the frame with determined rotation parameters of the previous frame. In some examples, the smoothing comprises utilizing an autoregressive filter.

In some examples, the direction preference of the coding scheme depends at least in part on a bit rate at which the input audio signal is to be encoded.

In some examples, the spatial direction of the dominant sound component is determined using a direction of arrival (DOA) analysis.

In some examples, the spatial direction of the dominant sound component is determined using a principal components analysis (PCA).

In some examples, some methods involve quantizing at least one of the rotation parameters or the indication of the spatial direction of the dominant sound component, wherein the sound components are rotated using the quantized rotation parameters or the quantized indication of the spatial direction of the dominant sound component. In some examples, quantizing the rotation parameters or the indication of the spatial direction of the dominant sound component comprises encoding a numerical value corresponding to a point of a set of points uniformly distributed on a portion of a sphere. In some examples, some methods involve smoothing the rotation parameters relative to rotation parameters associated with a previous frame of the input audio signal prior to quantizing the rotation parameters or prior to quantizing the indication of the spatial direction of the dominant sound component.

In some examples, some methods involve smoothing a covariance matrix used to determine the spatial direction of the dominant sound component of the frame relative to a covariance matrix used to determine a spatial direction of a dominant sound component of a previous frame of the input audio signal.

In some examples, determining the rotation parameters comprises determining one or more rotation angles subject to a limit determined based at least in part on a rotation applied to a previous frame of the input audio signal. In some examples, the limit indicates a maximum rotation from an orientation of the dominant sound component based on the rotation applied to the previous frame of the input audio signal.

In some examples, rotating the sound components comprises interpolating from previous rotation parameters associated with a previous frame of the input audio signal to the determined rotation parameters for samples of the frame of the input audio signal. In some examples, the interpolation comprises a linear interpolation. In some examples, the interpolation comprises applying a faster rotation to samples at a beginning portion of the frame relative to samples at an ending portion of the frame.

In some examples, the rotated sound components and the indication of the rotation parameters are usable by a decoder to reverse the rotation of the sound components prior to rendering the sound components.

Some methods may involve receiving, by a decoder, information representing rotated audio components of a frame of an audio signal and a parameterization of rotation parameters used to generate the rotated audio components, wherein the rotated audio components were rotated, by an encoder, from an original orientation, and wherein the rotated audio components have been rotated to a rotated orientation that aligns with a spatial preference of a coding scheme used by the encoder and the decoder. Some methods may involve decoding the received information based at least in part on the coding scheme. Some methods may involve reversing a rotation of the audio components based at least in part on the parameterization of the rotation parameters to recover the original orientation. Some methods may involve rendering the audio components at least partly subject to the recovered original orientation.

In some examples, reversing the rotation of the audio components comprises rotating the audio components around a first axis by a first rotation amount and optionally around a second axis a second rotation amount, and wherein the first rotation amount and the optional second rotation amount are indicated in the parameterization of the rotation parameters. In some examples, the first rotation amount is an azimuthal rotation amount and the optional second rotation amount is an elevational rotation amount. In some examples, the first axis or the second axis is perpendicular to a vector associated with a dominant sound component of the audio components. In some examples, the first axis or the second axis perpendicular to a third axis that is associated with the spatial preference of the coding scheme.

In some examples, reversing the rotation of the audio components comprises rotating the audio components around an axis perpendicular to a plane formed by a dominant sound component of the audio components prior to the rotation and an axis corresponding to the spatial preference of the coding scheme, and wherein information indicating the axis perpendicular to the plane is included in the parameterization of the rotation parameters.

Some methods may involve determining, by an encoder, a spatial direction of a dominant sound component in a frame of an input audio signal. Some methods may involve determining, by the encoder, rotation parameters based on the determined spatial direction and a direction preference of a coding scheme to be used to encode the input audio signal. Some methods may involve modifying the direction preference of the coding scheme to generate an adapted coding scheme, wherein the modified direction preference is determined based on at least one of the rotation parameters or the determined spatial direction of the dominant sound component such that the spatial direction of the dominant sound component is aligned with the modified direction preference of the adapted coding scheme. Some methods may involve encoding sound components of the frame of the input audio signal using the adapted coding scheme in connection with an indication of the modified direction preference.

Some methods may involve receiving, by a decoder, information representing audio components of a frame of an audio signal and an indication of an adaptation of a coding scheme by an encoder to encode the audio components, wherein the coding scheme was adapted by the encoder such that a spatial direction of a dominant sound component of the audio components and a spatial preference of the coding scheme are aligned. Some methods may involve adapting the decoder based on the indication of the adaptation of the coding scheme. Some methods may involve decoding the audio components of the frame of the audio signal using the adapted decoder.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via an apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The present disclosure provides various technical advantages. For example, by rotating sound components to align with a directional preference of a coding scheme, high sound quality may be preserved while encoding audio signals in a bit-rate efficient manner. This may allow accuracy in sound source positioning in scene-based audio, even when audio signals are encoded with relatively lower bit rates and when sound components are not positioned in alignment with a directional preference of the coding scheme.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1A:
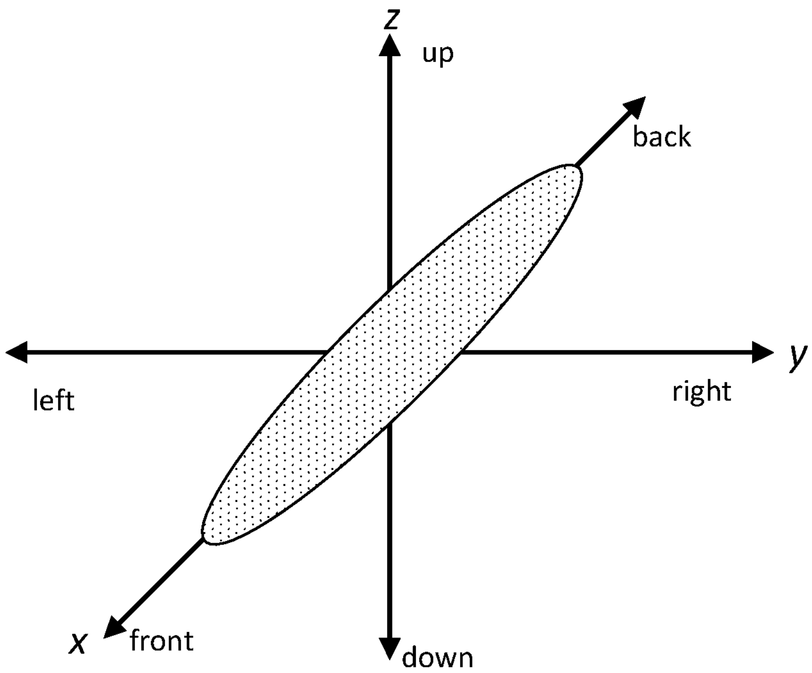
FIGS. 1A and 1B show schematic examples of orientation-dependent encoding in accordance with some implementations.

Some coding techniques for scene-based audio (e.g., Ambisonics) rely on coding multiple Ambisonics component signals after a downmix operation. Downmixing may allow a reduced number of audio components to be coded in a waveform encoded manner (e.g., in waveform-retaining fashion), and the remaining components may be encoded parametrically. On the receiver side, the remaining components may be reconstructed using parametric metadata indicative of the parametric encoding. Because only a subset of the components are waveform encoded and the parametric metadata associated with the parametrically encoded components may be encoded efficiently with respect to bit rate, such a coding technique may be relatively bit rate efficient while still allowing high quality audio.

By way of example, a First Order Ambisonics (FOA) signal may have W, X, Y, and Z components, where the W component is an omnidirectional signal, and where the X, Y, and Z components are direction-dependent. Continuing with this example, with certain codecs (e.g., the Immersive Voice and Audio Services (IVAS) codec), at a lowest bit rate (e.g., 32 kbps), the FOA signal may be downmixed to one channel, where only the W component is waveform encoded, and the X, Y, and Z components may be parametrically encoded. Continuing still further with this example, at a higher level bit rate (e.g., 64 kbps), the FOA signal may be downmixed to two channels, where the W component and one direction dependent component are waveform encoded, and the remaining direction dependent components are parametrically encoded. In one example, the W and Y components are waveform encoded, and the X and Z components may be parametrically encoded. In this case, because the Y component is waveform encoded, whereas the X and Z components are parametrically encoded, the encoding of the FOA signal is orientation dependent.

In instances in which a dominant sound component is not aligned with the selected direction dependent component, reconstruction of the parametrically encoded components may not be entirely satisfactory. For example, in an instance in which the W and Y components are waveform encoded and in which the X and Z components are parametrically encoded, and in which the dominant sound component is not aligned with the Y axis (e.g., in which the dominant sound component is substantially aligned with the X axis or the Z axis, or the like), it may be difficult to accurately reconstruct the X and Z components using the parametric metadata at the receiver. Moreover, because the dominant sound component is not aligned with the waveform encoded axis, the reconstructed FOA signal may have spatial distortions or other undesirable effects.

In some implementations, the techniques described herein perform a rotation of sound components to align with a directional preference of a coding scheme. For example, in an instance in which the directional preference of the coding scheme is along the Y axis (e.g., in the example given above in which W and Y components are waveform encoded), the techniques described herein may rotate the sound components of a frame such that a dominant sound component of the frame is aligned with the Y axis. The rotated sound components may then be encoded. Additionally, rotation parameters that include information that may be used by a decoder to reverse the rotation of the rotated sound components may be encoded. For example, the angles of rotation used to rotate the sound components may be provided. As another example, the location (e.g., in spherical coordinates) of the dominant sound component of the frame may be encoded. The encoded rotated sound components and the encoded rotation parameters may be multiplexed in a bit stream.

A decoder of a receiver device may de-multiplex the encoded rotated sound components and the encoded rotation parameters and perform decoding to extract the rotated sound components and the rotation parameters. The decoder may then utilize the rotation parameters to reverse the rotation of the rotated sound components such that the sound components are reconstructed to their original orientation. The techniques described herein may allow high sound quality with a reduced bit rate, while also maintaining accuracy in sound source positioning in scene-based audio, even when sound components are not positioned in alignment with a directional preference of the coding scheme.

The examples described herein generally utilize the Spatial Reconstruction (SPAR) perceptual encoding scheme. In SPAR, a FOA audio signal may be spatially processed during downmixing such that some channels are waveform encoded and some channels are parametrically encoded based on metadata determined by a SPAR encoder. SPAR is further described in D. McGrath, S. Bruhn, H. Purnhagen, M. Eckert, J. Torres, S. Brown, and D. Darcy *Immersive Audio Coding for Virtual Reality Using a Metadata-assisted Extension of the 3GPP EVS Codec* IEEE International Conference on Acoustics, Speech and Signal Processing (ICASSP), 2019, pp. 730-734, which is hereby incorporated by reference in its entirety. It should be noted that although the SPAR coding scheme is sometimes utilized herein in connection with various examples, the SPAR coding scheme is merely one example of a coding scheme that utilizes a directional preference for FOA downmixing. In some implementations, the techniques described herein may be utilized with any suitable scene-based audio coding scheme.

FIG. 1A shows an example of a point cloud associated with a FOA audio signal, where the points represent three-dimensional (3D) samples of the X, Y, Z component signals. As illustrated, the audio signal depicted in FIG. 1A has a dominant sound component oriented along the X axis (e.g., the front-back axis). The audio signal does not have dominant components in other directions (e.g., along the Y axis or along the Z axis). If such an audio signal were to be encoded using a coding scheme that downmixes the audio signal to two channels, a W component, which is an omni-directional signal, is encoded. Additionally, in an instance in which the coding scheme selects a second directional component channel as along the Y-axis (e.g., the IVAS/SPAR coding scheme), the Y component is encoded. Accordingly, in such a coding scheme, the W and Y components may be well-represented and well-encoded. However, because the audio signal depicted in FIG. 1A does not have a dominant component in Y direction, and is instead oriented along the X axis, when being decoded, the X component may not be adequately reconstructed. This may lead to a degradation in sound quality and sound perception. For example, when rendered, the decoded and reconstructed sound may not faithfully reconstruct the dominant sound component along the X axis.

Figure 1B:
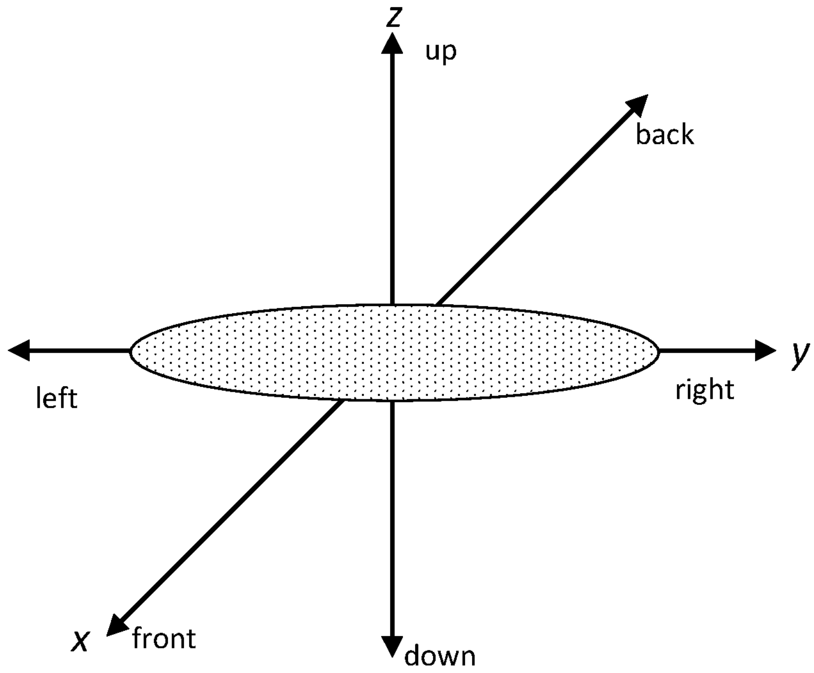

FIG. 1B illustrates the audio signal depicted in FIG. 1A rotated 90 degrees around the Z axis. The dominant sound component, which in FIG. 1A was aligned with the X axis, when rotated 90 degrees around the Z axis, is aligned with the Y axis (e.g., the left-right axis) as shown in FIG. 1B. In an instance in which a coding scheme utilizes two downmix channels to encode the audio signal shown in FIG. 1B, where the two downmix channels correspond to the W component (e.g., the omnidirectional component) and the Y component, the perceptual aspects of the audio signal depicted in FIG. 1B may be faithfully encoded and preserved, because the coding scheme faithfully encodes the component that is aligned with the orientation of the dominant sound component. In other words, the audio signal depicted in FIG. 1B has been rotated such that an orientation of the dominant sound component aligns with the directional preference of the coding scheme.

In some implementations, the rotated sound components, along with an indication of the rotation that was performed with an encoder, may be encoded as a bit stream. For example, the encoder may encode rotational parameters that indicate that the sound components of the audio signal depicted in FIG. 1A were rotated 90 degrees around the Z axis to generate the encoded sound components depicted in FIG. 1B. A decoder may then receive the bit stream and decode the bit stream to obtain the sound components depicted in FIG. 1B and the rotational parameters that indicate that a rotation of 90 degrees around the Z axis was performed. Continuing with this example, the decoder may then reverse the rotation of the sound components to re-generate the sound components of the audio signal depicted in FIG. 1A, e.g., the reconstruction of the original sound components. The reconstruction of the original sound components may then be rendered. Techniques for performing the rotation and encoding of the sound components (e.g., by an encoder) are shown in and described below in connection with FIG. 2. Techniques for reversing the rotation of the sound components (e.g., by a decoder) are shown in and described below in connection with FIG. 3.

In some implementations, an encoder rotates sound components of an audio signal and encodes the rotated audio components in connection with rotation parameters. In some implementations, the audio components are rotated by an angle that is determined based on: 1) the spatial direction of the dominant sound component in the audio signal; and 2) a directional preference of the coding scheme. For example, the directional preference may be based at least in part on a bit rate to be used in the coding scheme. As a more particular example, a lowest bit rate (e.g., 32 bits per second) may be used to encode just the W component such that the coding scheme has no directional preference. Continuing with this more particular example, a next higher bit rate (e.g., 64 bits per second) may be used to encode the W component and the Y component, such that the coding scheme has a directional preference along the Y axis. The examples described herein will generally relate to a condition in which the W component and the Y component are encoded, although other coding schemes and other directional preferences may be derived using the techniques described herein.

Figure 2:
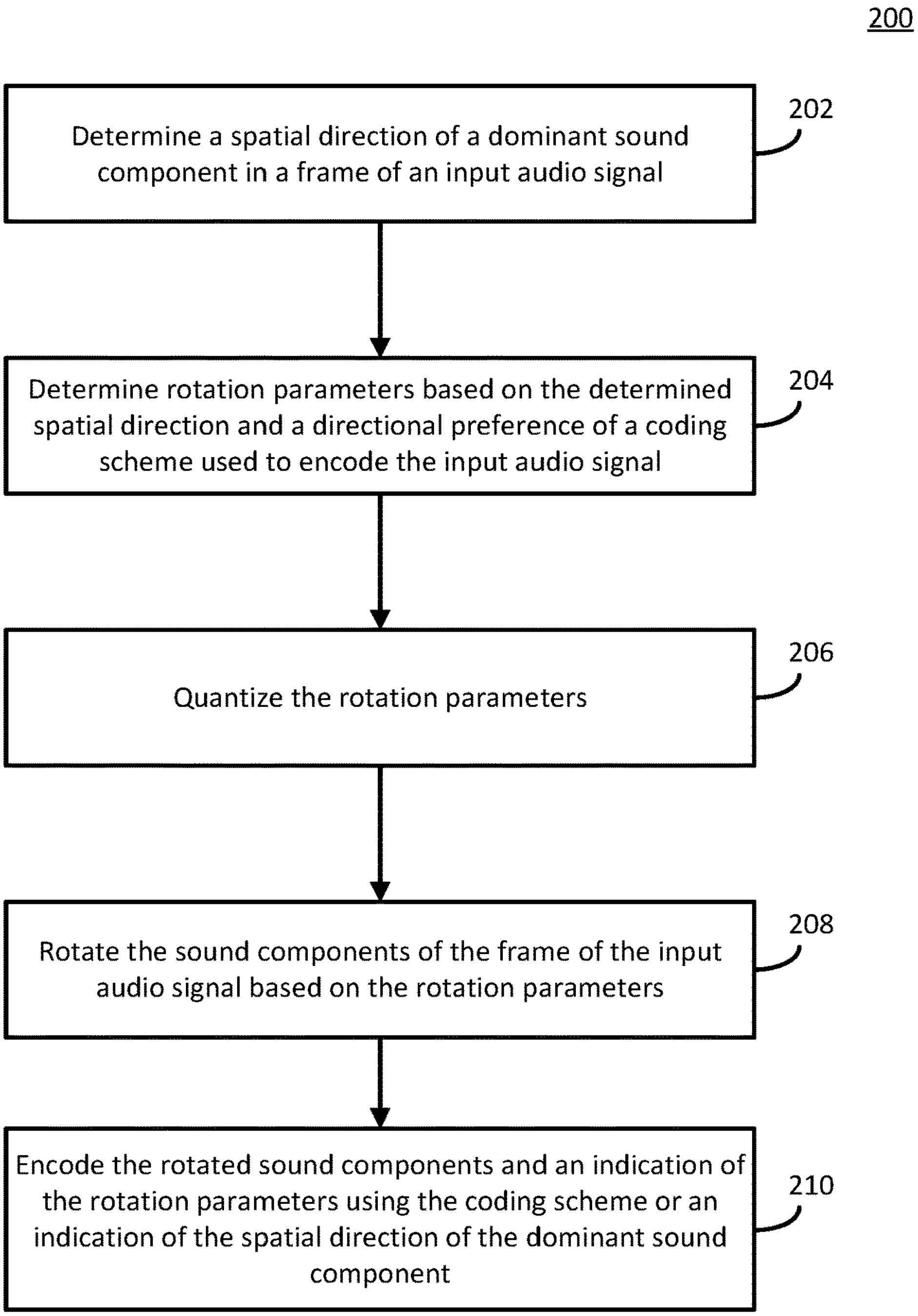
FIG. 2 is a flowchart depicting an example process for rotating sound components in alignment with a directional preference of a coding scheme in accordance with some implementations.

FIG. 2 shows a flowchart depicting an example process 200 for rotating sound components and encoding the rotated sound components in connection with rotation parameters in accordance with some implementations. Blocks of process 200 may be performed by an encoder. In some implementations, two or more blocks of process 200 may be performed substantially in parallel. In some implementations, blocks of process 200 may be performed in an order other than what is shown in FIG. 2. In some implementations, one or more blocks of process 200 may be omitted.

Process 200 can begin at 202 by determining a spatial direction of a dominant sound component in a frame of an input audio signal. In some implementations, the spatial direction may be determined as spherical coordinates (e.g., ($\alpha$, $\beta$), where $\alpha$ indicates an azimuthal angle, and $\beta$ indicates an elevational angle). In some implementations, the spatial direction of the dominant sound component may be determined using direction of arrival (DOA) analysis of the frame of the input audio signal. DOA analysis may indicate a location of an acoustic point source (e.g., positioned at a location having coordinates ($\alpha$, $\beta$)) from which sound originating yields the dominant sound component of the frame of the input audio signal. DOA analysis may be performed using, for example, the techniques described in Pulkki, V., Delikaris-Manias S., Politis, A., *Parametric Time-Frequency Domain Spatial Audio,* 2018, 1st edition, which is incorporated by reference herein in its entirety. In some implementations, the spatial direction of the dominant sound component may be determined by performing principal components analysis (PCA) on the frame of the input audio signal. In some implementations, the spatial direction of the dominant sound component may be determined by performing a Karhunen-Loeve transform (KLT).

In some implementations, a metric that indicates a degree of dominance, or strength, of the dominant sound component is determined. One example of such a metric is a direct-to-total energy ratio of the frame of the FOA signal. The direct-to-total energy ratio may be within a range of 0 to 1, where lower values indicate less dominance of the dominant sound component relative to higher values. In other words, lower values may indicate a more diffuse sound with a less strong directional aspect.

It should be noted that, in some implementations, process 200 may determine that rotation parameters need not be uniquely determined based on the degree of the strength of the dominant sound component. For example, in response to determining that the direct-to-total energy ratio is below a predetermined threshold (e.g., 0.5, 0.6, 0.7, or the like), process 200 may determine that rotation parameters need not be uniquely determined for the current frame. For example, in some such implementations, process 200 may determine that the rotation parameters from the previous frame may be re-used for the current frame. In such examples, process 200 may proceed to block 208 and rotate sound components using rotation parameters determined for the previous frame. As another example, in some implementations, process 200 may determine that no rotation is to be applied, because any directionality present in the FOA signal may reflect creator intent that is to be preserved, for example, determined based on metadata received with the input audio signal. In such examples, process 200 may omit the remainder of process 200 and may proceed to encode downmixed sound components without rotation. As yet another example, in some implementations, process 200 may estimate or approximate rotation parameters based on other sources. For example, in an instance in which the input audio signal is associated with corresponding video content such as the position of a speaking person, process 200 may estimate the rotation parameters based on locations and/or orientations of various content items in the video content. In some such examples, process 200 may proceed to block 206 and may quantize the estimated rotation parameters determined based on other sources.

At 204, process 200 may determine rotation parameters based on the determined spatial direction and a directional preference of a coding scheme used to encode the input audio signal. In some implementations, the directional preference of the coding scheme may be determined and/or dependent on a bit rate used to encode the input audio signal. For example, a number of downmix channels, and therefore, which downmix channels are used, may depend on the bit rate.

It should be noted that, rotation of sound components may be performed using a two-step rotation technique in which the sound components are rotated around a first axis (e.g., the Z axis) and then around a second axis (e.g., the X axis) to align the sound components with a third axis (e.g., the Y axis). Note that the two-step rotation technique is shown in and described below in more detail in connection with FIGS. 5A, 5B, and 6. In some such implementations, the directional preference of the coding scheme may be indicated as $\alpha_{opt}$ and $\beta_{opt}$, where $\alpha_{opt}$ indicates the directional preference in the azimuthal direction and where $\beta_{opt}$ indicates the directional preference in the elevational direction. By way of example, in an instance in which W and Y components are to be encoded, $\beta_{opt}$ may be 0 degrees, and as $\alpha_{opt}$ may be 90 degrees, indicating alignment with the positive Y axis (e.g., in the left direction). Continuing with this example, in an instance in which the spatial direction of the dominant sound component is ($\alpha$, $\beta$), an azimuthal rotation amount $\alpha_{rot}$ and an elevational rotation amount $\beta_{rot}$ may be determined by:

$$\alpha_{rot} = \alpha_{opt} - \alpha; \text{ and } \beta_{rot} = \beta_{opt} - \beta$$

Alternatively, in some implementations, rotation of sound components may be performed using a great circle technique in which sound components are rotated around an axis perpendicular to a plane formed by the dominant sound component and the axis corresponding to the directional preference of the coding scheme. Note that the great circle technique is shown in and described below in more detail in connection with FIGS. 7 and 8. For example, in an instance in which the directional preference corresponds to the Y axis, the plane may be formed by the dominant sound component and the Y axis. The axis perpendicular to the plane is generally referred to herein as N. In such implementations, the axis by which the sound components are to be rotated around the perpendicular axis N is generally referred to herein as $\Theta$. In some implementations, the perpendicular axis N and the rotation angle $\Theta$ may be considered rotation parameters.

It should be noted that, in some implementations, smoothing may be performed on determined rotation angles (e.g., on $\alpha_{rot}$ and $\beta_{rot}$, or on $\Theta$ and N), for example, to allow for smooth rotation across frames. For example, smoothing may be performed using an autoregressive filter (e.g., of order 1, or the like). As a more particular example, given determined rotation angles for a two-step rotation technique of $\alpha_{rot}$(n) and $\beta_{rot}$(n) for a current frame n, smoothed rotation angles $\alpha_{rot\_smoothed}$(n) and $\beta_{rot\_smoothed}$(n) may be determined by:

$$\alpha_{rot_{smoothed}}(n) = \delta * \alpha_{rot_{smoothed}}(n-1) + (1-\delta) * \alpha_{rot}(n)$$

$$\beta_{rot_{smoothed}}(n) = \delta * \beta_{rot_{smoothed}}(n-1) + (1-\delta) * \beta_{rot}(n)$$

In the above, $\delta$ may have a value between 0 and 1. In one example, $\delta$ is about 0.8.

Alternatively, in some implementations, smoothing may be performed on covariance parameters or covariance matrices that are generated in the DOA analysis, PCA analysis, and/or KLT analysis to determine the direction of the dominant sound component. The smoothed covariance matrices may then be used to determine rotation angles. It should be noted that in instances in which smoothing is applied to determined directions of the dominant sound component across successive frames, various smoothing techniques, such as an autoregressive filter or the like, may be utilized.

In some instances, the smoothing operation (on rotation angles or on covariance parameters or matrices) can advantageously be reset when a transient directional change occurs rather than allowing such a transient change to affect subsequent frames.

It should be noted that, in some implementations, process 200 may determine and/or modify rotation angles determined at block 204 subject to a rotational limit from a preceding frame to a current frame. For example, in some implementations, process 200 may limit a rate of rotation (e.g., to 15° per frame, 20° per frame, or the like). Continuing with this example, process 200 can modify rotation angles determined at block 204 subject to the rotational limit. As another example, in some implementations, process 200 may determine that the rotation is not to be performed if a change in rotation angles of the current frame from the preceding frame is smaller than a predetermined threshold. In other words, process 200 may determine that small rotational changes between successive frames are not to be implemented, thereby applying hysteresis to the rotation angles. By not performing rotations unless a change in rotation angle substantially differs from the rotation angle of a preceding frame, small jitters in direction of the dominant sound are not reflected in corresponding jitters in the rotation angle.

Figure 4A:
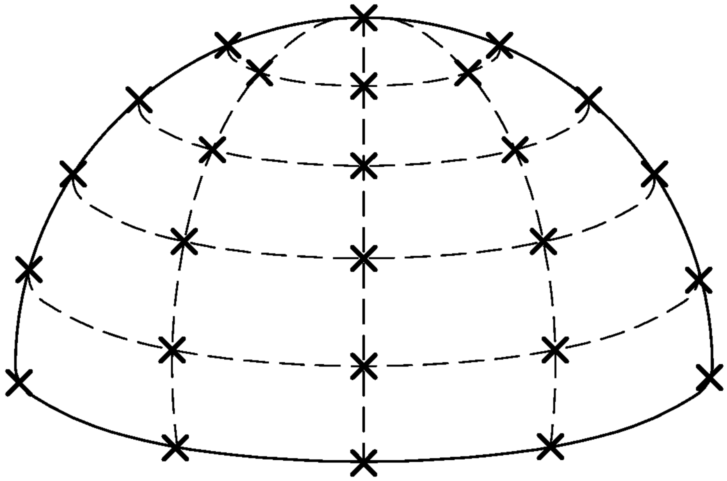
FIGS. 4A, 4B, and 4C are schematic diagrams that may be used to illustrate various quantization techniques in accordance with some implementations.

At 206, process 200 may quantize the rotation parameters (e.g., that indicate an amount by which the sound components are to be rotated around the relevant rotation axes). For example, referring to the two-step rotation technique, in some implementations, the rotation amount in the azimuthal direction (e.g., $\alpha_{rot}$) may be quantized to be $\alpha_{rot,\ q}$, and the rotation amount in the elevational direction (e.g., $\beta_{rot}$) may be quantized to be $\beta_{rot,\ q}$. As another example, referring to the great circle rotation technique, the rotation amount about the perpendicular axis N may be quantized to $\Theta_q$, and the direction of the perpendicular axis N may be quantized to $N_q$. As yet another example, referring to the great circle rotation technique, in some implementations, the direction of the dominant sound component (e.g., α and β) may be quantized, and the decoder may determine the direction of the perpendicular axis N and the rotation angle Θ about N using a priori knowledge of the spatial preference of the coding scheme (e.g., a priori knowledge of $\alpha_{opt}$ and $\beta_{opt}$). In some implementations, each angle may be quantized linearly. For example, in an instance in which 5 bits are used to encode a rotation angle, the rotation angle may be quantized to one of 32 steps. As another example, in an instance in which 6 bits are used to encode a rotation angle, the rotation angle may be quantized to one of 64 steps. Additional techniques for quantization are shown in and described below in connection with FIGS. 4A and 4B. It should be noted that, in some implementations, a relatively coarse quantization may be utilized to prevent small jitters in direction of the dominant sound from causing corresponding jitters in the quantized rotation angles.

It should be noted that in some implementations, smoothing may be performed prior to quantization, such as described above in connection with block 204. Alternatively, in some implementations, smoothing may be performed after quantization. In instances in which smoothing is performed after quantization, the decoder may additionally have to perform smoothing of decoded rotation angles. In such instances, smoothing filters at the encoder and the decoder run in a substantially synchronized manner such that the decoder can accurately reverse a rotation performed by the encoder. For example, in some implementations, smoothing operations may be reset under pre-determined conditions readily available at encoder and decoder, such as at a fixed time grid (e.g. each $n^{th}$ frame after codec reset/start) or upon transients detected based on the transmitted downmix signals.

Referring back to FIG. 2, at 208, process 200 can rotate the sound components of the frame of the input audio signal based on the rotation parameters. For example, in some implementations, process 200 can perform a two-step rotation technique in which the sound components are first rotated by $\alpha_{rot,\ q}$ around a first axis (e.g., the Z axis) to align the sound components with a direction of $\alpha_{opt}$. Continuing with this example, process 200 can then rotate the sound components by $\beta_{rot,\ q}$ around a second axis (e.g., the X axis) to align the sound components with a direction of $\beta_{opt}$. More detailed techniques for performing a two-step rotation technique are shown in and described below in connection with FIGS. 5A, 5B, and 6. As another example, in some implementations, process 200 may perform a rotation of the sound components around the axis perpendicular to a plane (e.g., the axis N described above) formed by the dominant sound component and an axis corresponding to the directional preference of the coding scheme (e.g., the Y axis, in the example given above). This technique causes the sound components to be rotated along a great circle, which may lead to more consistent rotations for sound components located near the poles (e.g., having an elevational angle of about +/−90 degrees). More detailed techniques for performing the great circle rotation technique are shown in and described below in connection with FIGS. 7 and 8.

It should be noted that, in some implementations, process 200 may perform sample-by-sample interpolation across samples of the frame. The interpolation may be performed from rotation angles determined from a previous frame (e.g., as applied to a last sample of the previous frame) to rotation angles determined (e.g., at block 206) and as applied to the last sample of the current frame. In some implementations, interpolation across samples of a frame may ameliorate perceptual discontinuities that may arise from two successive frames being associated with substantially different rotation angles. In some implementations, the samples may be interpolated using a linear interpolation. For example, in an instance in which a two-step rotation is performed (e.g., the sound components are rotated by $\alpha_{rot,\ q}$ around a first axis and by $\beta_{rot,\ q}$ around a second axis), a ramp function may be used to linearly interpolated between $\alpha'_{rot,\ q}$ of a previous frame and $\alpha_{rot,\ q}$ of a current frame, and similarly, between $\beta'_{rot,\ q}$ of a previous frame and $\beta_{rot,\ q}$ of a current frame. For example, for a frame n, an interpolated azimuthal rotation angle $\alpha_{int}(n)$ is represented by:

$$\alpha_{int}(n) = \alpha'_{rot,q} * w(n) + \alpha_{rot,q} * (1 - w(n)),\ n = 1\ \ldots\ L$$

In the above, L indicates a length of the frame, and w(n) may be a ramp function. One example of a suitable ramp function is:

$$w(n) = \frac{(L - n)}{L}$$

It should be noted that a similar interpolation may be performed for the elevational rotation angle, $\beta_{rot,\ q}$. In instances in which rotation is performed using the great circle rotation technique where a rotation of the sound components is performed around an axis perpendicular to a plane formed by the dominant sound component and an axis corresponding to the directional preference of the coding scheme by an angle $\Theta_q$ (e.g., as shown in and described below in connection with FIGS. 7 and 8), the angle formed by the vectors associated with the dominant sound components of two successive frames may be interpolated in a similar fashion across samples of the frame. In some implementations (e.g., in instances in which the great circle technique is used and the perpendicular axis changes between two successive frames), the great circle interpolation technique described below in connection with FIG. 9B may be utilized.

In some implementations, rather than performing a linear interpolation across samples of the frame, process 200 may perform a non-linear interpolation. For example, in some implementations, rotation angles may be interpolated such that a faster change in rotation angles occur for samples in a beginning portion of the frame relative to samples in an end portion of the frame. Such an interpolation may be implemented by applying an interpolation function with shortened ramp portion in the beginning of the frame. In one example, weights w(n) may be determined according to:

$$w(n) = \begin{cases} \frac{(M-n)}{M}, & 1 \le n \le M \\ 0, & M < n < L \end{cases}$$

In the equation given above, interpolation is performed over M samples of a frame having length L samples, where M is less than or equal to L.

In some implementations, rather than interpolating between rotation angles, process 200 may perform an interpolation between a direction of a dominant sound component from a previous frame and a direction of a dominant sound component of a current frame. For example, in some implementations, an interpolated sound direction may be determined for each sample of the frame. Continuing with this example, each interpolated position may then be used for rotation, using either the two-step rotation technique or the great circle technique. Interpolation of dominant sound component directions is shown in FIG. 9A (using a technique that linearly interpolates between the positions of the dominant sound component represented by the two spherical coordinate angles (α, β) in two successive frames) and 9B (using a technique that linearly interpolates through a great circle path between the dominant sound components in two successive frames).

Figure 8:
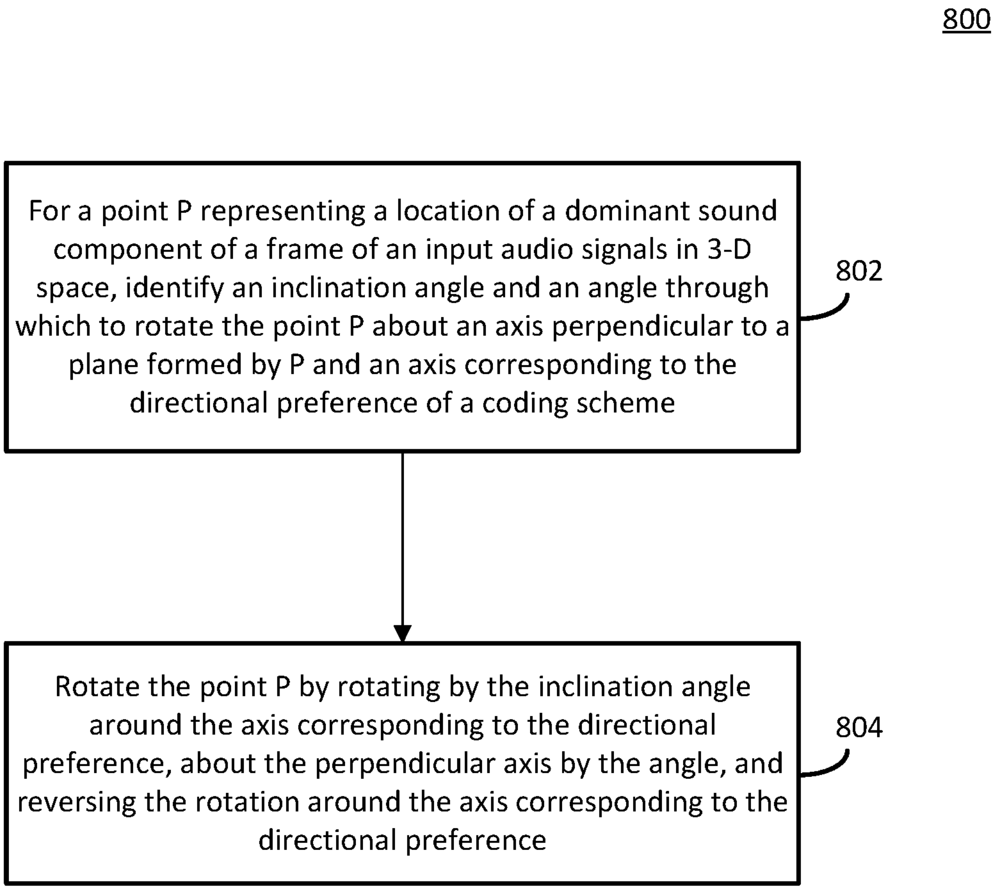
FIG. 8 is a flowchart depicting an example process for performing a great circle rotation technique in accordance with some implementations.
Figure 9A:
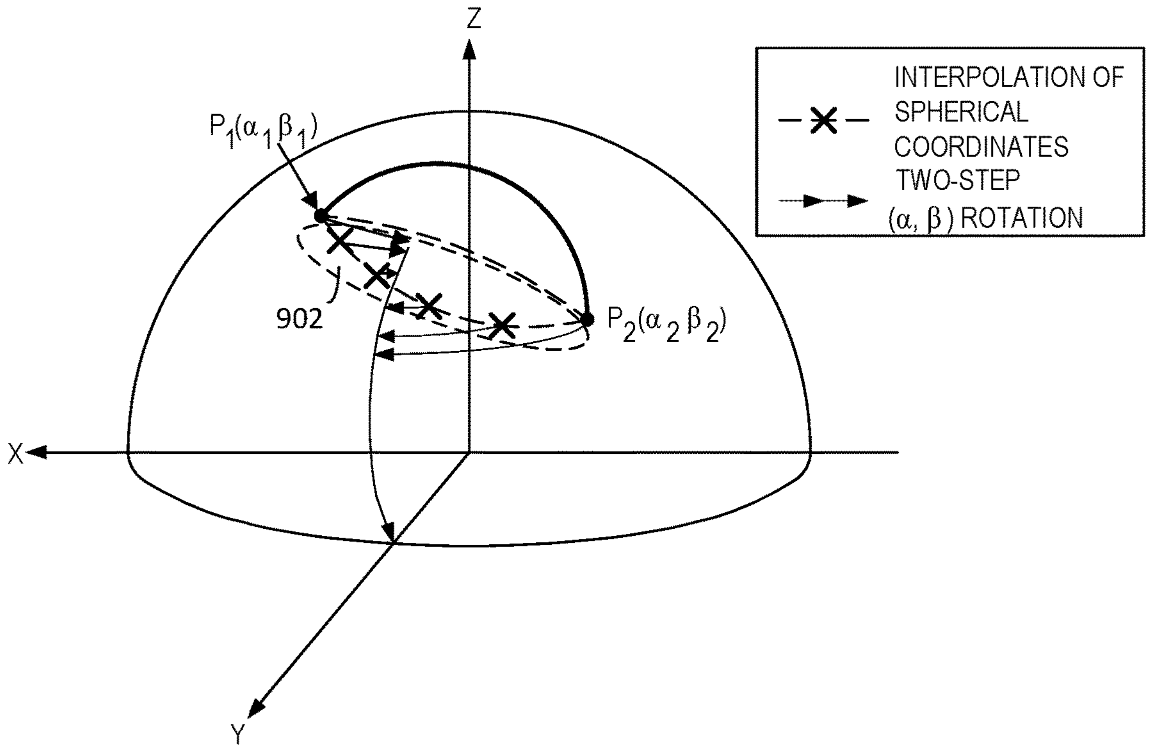
FIGS. 9A and 9B are schematic diagrams that illustrate techniques for interpolating between samples of a frame in accordance with some implementations.

Referring to FIG. 9A, to interpolate between a dominant sound component direction of a preceding frame (depicted in FIG. 9A as $P_1(\alpha_1, \beta_1)$) to a dominant sound component direction of a current frame (depicted in FIG. 9A as $P_2(\alpha_2, \beta_2)$), the spherical coordinates of each dominant sound component are interpolated to form a set of interpolated points 902. Each interpolated point from the set of interpolated points 902 is then used for rotation to the (directionally-preferred) Y axis. In some implementations, rotation to the directionally-preferred Y axis may be performed using the two-step rotation technique. For example, a corresponding subset of audio samples may be rotated around the Z axis by an azimuthal angle of $\alpha_{interp,rot}$ and then around the X axis by an elevational angle of $\beta_{interp,rot}$ to be aligned with the Y axis, as shown in FIG. 9A. Each rotation around the Z axis may be along a rotation path parallel to the equator (e.g., along lines of latitude of the sphere). It should be noted that, alternatively, in some implementations, rotation to the directionally-preferred Y axis may be performed using the great circle technique shown in and described in connection with FIGS. 7 and 8.

It should be noted that, in certain cases (e.g., in instances in which $P_1$ and $P_2$ are not on the equator or $P_1$ and $P_2$ are not on the same meridian), the set of interpolated points 902 may not be evenly spaced. When rotated samples are rendered using a uniform time scale, this may lead to perceptual effects, because, during rendering, traversal from $P_1$ to $P_2$ may be more rapid for some samples relative to others. An alternative in which traversal between $P_1$ to $P_2$ is uniform with respect to time is shown in FIG. 9B.

Figure 9B:
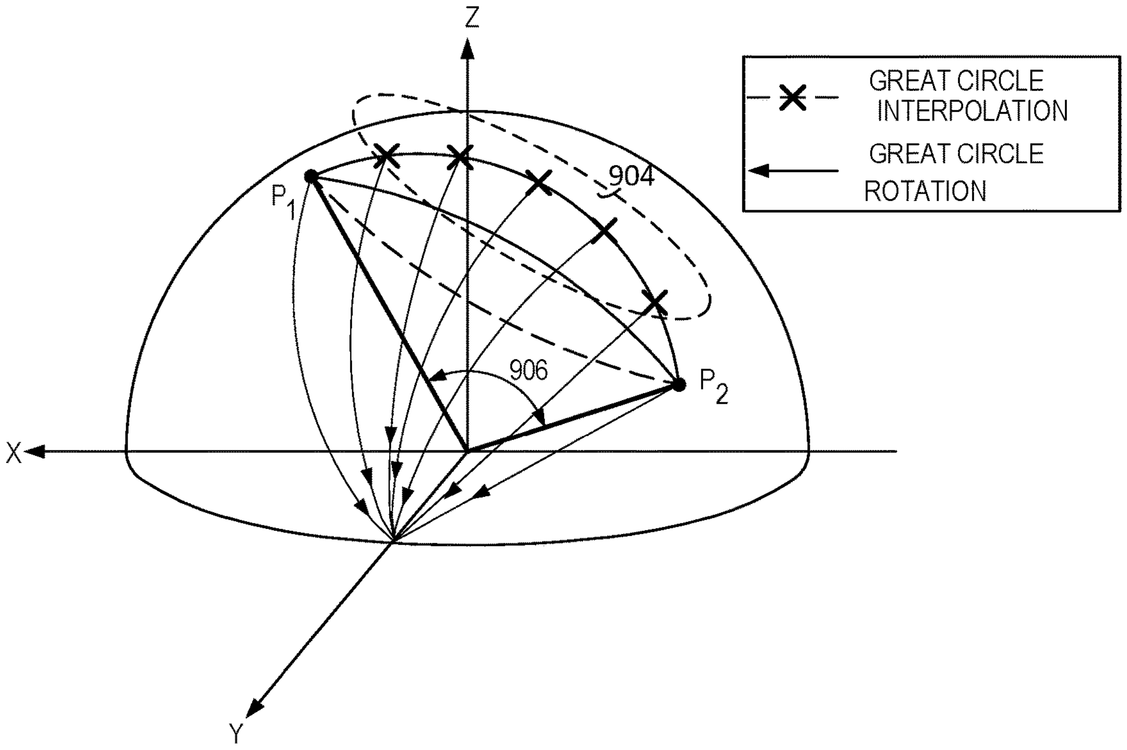

Referring to FIG. 9B, to interpolate between a dominant sound component direction in a preceding frame (depicted in FIG. 9B as $P_1$) to a dominant sound direction of a current frame (directed in FIG. 9B as $P_2$), a set of points 904 lying along a great circle path between $P_1$ and $P_2$ is determined. For example, set of points 904 may be determined by linearly interpolating across an angle 906 between $P_1$ and $P_2$. Then, each point in set of points 904 is rotated to the directionally-preferred Y axis. The rotation can be performed using the great circle technique, which is described below in more detail in connection with FIGS. 7 and 8, or it can be done using the two step rotation technique, described in connection with FIGS. 5A and 5B.

It should be noted that while the great circle interpolation technique with linear interpolation ensures equidistance of the interpolation points, it may have the effect that azimuth and elevation angles are not evolving linearly. The elevation angle may even evolve non-monotonically, such as initially increasing to some maximum elevation and then decreasing with increasing pace to the target interpolation point $P_2$. This may in turn lead to undesirable perceptual effects. For example, the first described technique, which linearly interpolates the two spherical coordinate angles (α, β), may in some cases be advantageous as the elevation angle is strictly confined to the interval $[\alpha_1, \alpha_2]$ with a strictly monotonic (e.g., linear) evolution of the elevation within it. Thus, the optimal interpolation method may in some cases be the technique that linearly interpolates the two spherical coordinate angles (α, β) according to FIG. 9A, whereas, in some other cases, the optimal interpolation method may be the great-circle interpolation techniques according to FIG. 9B, and in even other cases, the best interpolation path may be different from the path utilized by these two methods. Accordingly, in some implementations, it may be advantageous to adapt the method for selecting the interpolation path. For example, in some implementations, it may be possible to base this adaptation on additional information, such as knowledge about the spatial trajectory of the direction of the dominant sound. Such knowledge of the spatial trajectory of the direction of the dominant sound component may be obtained based on motion sensor information or a motion estimation of the sound capturing device, visual cues, or the like.

Referring back to FIG. 2, it should be noted that, rather than interpolating between samples of a frame, process 200 may cause a current frame to be cross-faded into a previous frame.

At 210, process 200 can encode the rotated sound components and an indication of the rotation parameters using the coding scheme or an indication of the spatial direction of the dominant sound component. In some implementations, the rotation parameters may include bits encoding the rotation angles that were used to rotate the sound components (e.g., $\beta_{rot,\ q}$ and $\beta_{rot,\ q}$). In some implementations, the direction of the dominant sound component (e.g., α and β) may be encoded, which is quantized prior to be encoded, e.g., using the techniques shown in and described below in connection with FIGS. 4A and 4B. It should be noted that, because the decoder has a priori knowledge of the directional preference of the coding scheme, a reversal of the rotation of the rotated sound components may be performed by the decoder using either the rotation angles used by the encoder, or, the direction of the dominant sound component. In other words, the decoder may use the direction of the dominant sound component and the directional preference of the coding scheme to determine the rotation angles that were utilized by the encoder, as described below in more detail in connection with FIG. 3.

In some implementations, the rotated sound components may be encoded using the SPAR coding method. In some implementations, the encoded rotation parameters may be multiplexed with the bits representing the encoded rotated sound components, as well as parametric metadata associated with a parametric encoding of the parametrically-encoded sound components. The multiplexed bit stream may then be configured for being provided to a receiver device having a decoder configured to decoder and/or reconstruct the encoded rotated sound components.

Figure 3:
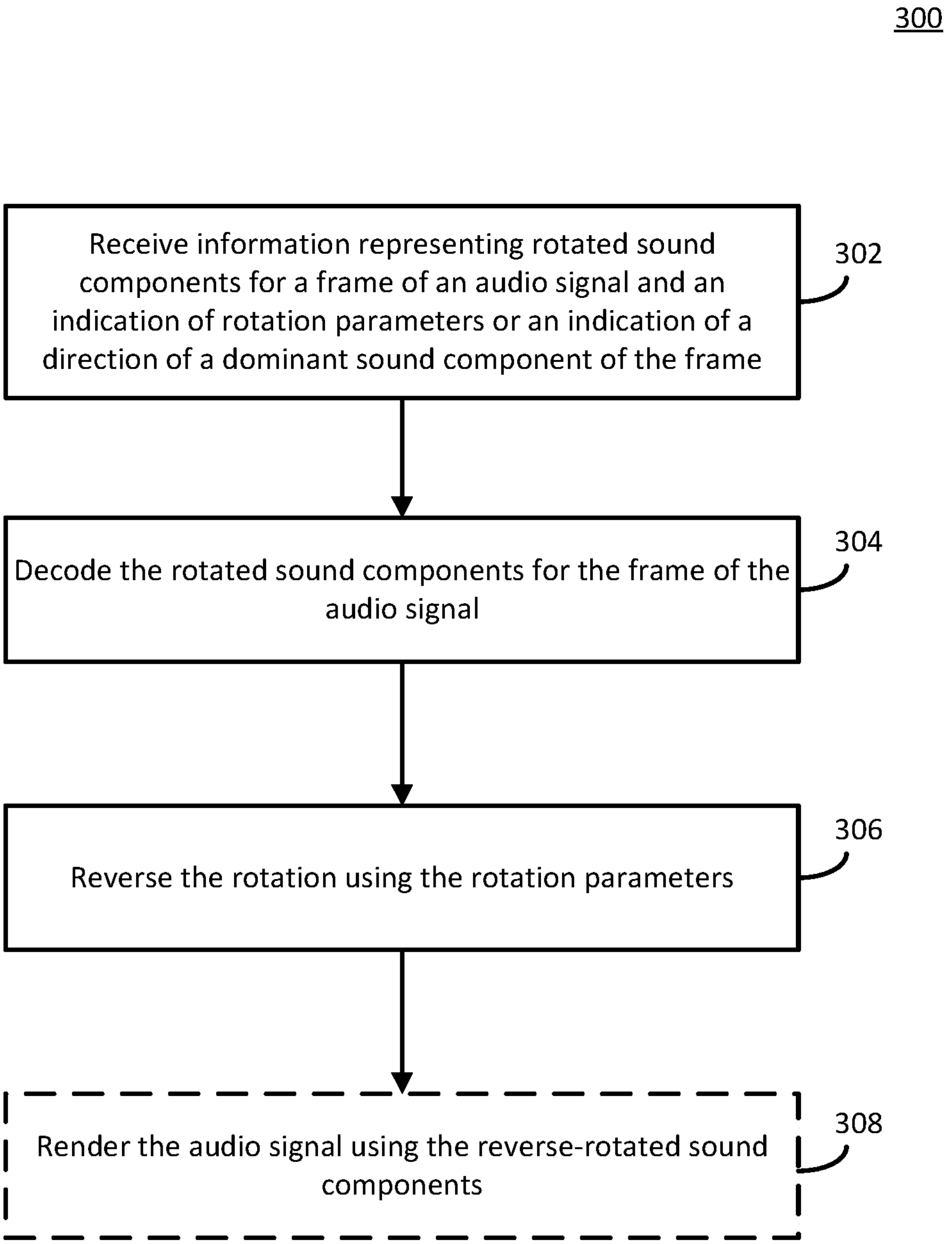
FIG. 3 is a flowchart depicting an example process for decoding and reversing a rotation of rotated sound components in accordance with some implementations.

FIG. 3 shows a flowchart depicting an example process 300 for decoding encoded rotated sound components and reversing a rotation of the sound components in accordance with some implementations. In some implementations, blocks of process 300 may be performed by a decoder. In some implementations, two or more blocks of process 300 may be performed substantially in parallel. In some implementations, blocks of process 300 may be performed in an order other than what is shown in FIG. 3. In some implementations, one or more blocks of process 300 may be omitted.

Process 300 can begin at 302 by receiving information representing rotated sound components for a frame of an input audio signal and an indication of rotation parameters (e.g., determined and/or applied by an encoder) or an indication of the direction of the dominant sound component of the frame. In some implementations, process 300 may then demultiplex the received information, e.g., to separate the bits representing the rotated sound components from the bits representing the rotation parameters. In some implementations, rotation parameters may indicate angles of rotation around particular axes (e.g., an X axis, a Z axis, an axis parallel to a plane formed by the dominant sound component and another axis, or the like). In instances in which process 300 receives an indication of the direction of the dominant sound component of the frame, process 300 may determine the rotation parameters (e.g., angles by which the sound components were rotated and/or axes about which the sound components were rotated) based on the direction of the dominant sound component and a priori knowledge indicating the directional preference of the coding scheme. For example, process 300 may determine the rotation parameters (e.g., rotation angles and/or axes about which rotation was performed) using similar techniques as those used by the encoder (e.g., as described above in connection with block 204).

At 304, process 300 can decode the rotated sound components. For example, process 300 can decode the bits corresponding to the rotated sound components to construct a FOA signal. Continuing with this example, the decoded rotated sound components may be represented as a FOA signal F as:

$$F = \begin{bmatrix} W \\ X \\ Y \\ Z \end{bmatrix},$$

where W represents the omnidirectional signal components, and X, Y, and Z represent the decoded sound components along the X, Y, and Z axes, respectively, after rotation. In some implementations, process 300 may reconstruct the components that were parametrically encoded by the encoder (e.g., the X and Z components) using parametric metadata extracted from the bit stream.

At 306, process 300 may reverse the rotation of the sound components using the rotation parameters. For example, in an instance in which the rotation parameters include a parameterization of the rotation angles applied by the encoder, process 300 may reverse the rotation using the rotation angles. As a more particular example, in an instance in which a two-step rotation was performed (e.g., first around the Z axis, and subsequently around the X axis), the two-step rotation may be reversed, as described below in connection with FIGS. 5A and 5B. As another more particular example, in an instance in which a great circle rotation is performed around an axis perpendicular to a plane formed by the dominant sound component and an axis aligned with the directional preference of the coding scheme (e.g., the Y axis), the great circle rotation may be reversed, as described below in connection with FIG. 7.

At 308, process 300 may optionally render the audio signal using the reverse-rotated sound components. For example, process 300 may cause the audio signal to be rendered using one or more speakers, one or more headphones or ear phones, or the like.

Figure 4B:
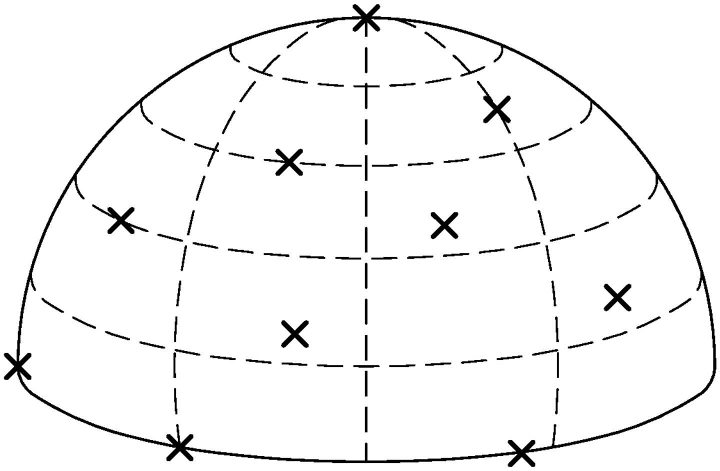

In some implementations, angles (e.g., angles of rotation and/or an angle indicating a direction of a dominant sound component, which may be used to determine angles of rotation applied by an encoder) may be quantized, e.g., prior to being encoded into a bit stream by the encoder. As described above, in some implementations, a rotation parameter may be quantized linearly, e.g., using 5 or 6 bits, which would yield 32 or 64 quantization steps, or points, respectively. However, referring to FIG. 4A, such a quantization scheme yields a large number of closely packed (quantizer reconstruction) points at the poles of the sphere, where each point corresponds to a different spherical coordinate to which a dominant direction may be quantized. For example, the point at the zenith of the sphere represents multiple points (e.g., one corresponding to each of the quantized values of α). Accordingly, in some implementations, an alternative set of points may be constructed, where the points of the set of points are distributed on the sphere, and a rotation angle or angle corresponding to a direction of dominant sound is quantized by selecting a nearest point from the set of points. In some implementations, the set of points may include various important cardinal points (e.g., corresponding to +/−90 degrees on various axes, or the like). In some implementations, the set of points may be distributed in a relatively uniform manner, such that points are roughly uniformly distributed over the entire sphere rather than being tightly clustered at the poles. An example of such a distribution of points is shown in FIG. 4B. The set of points may be created using various techniques. For example, in some implementations, points may be derived from icosahedron vertices iteratively until the set of points has achieved a target level of density.

Figure 4C:
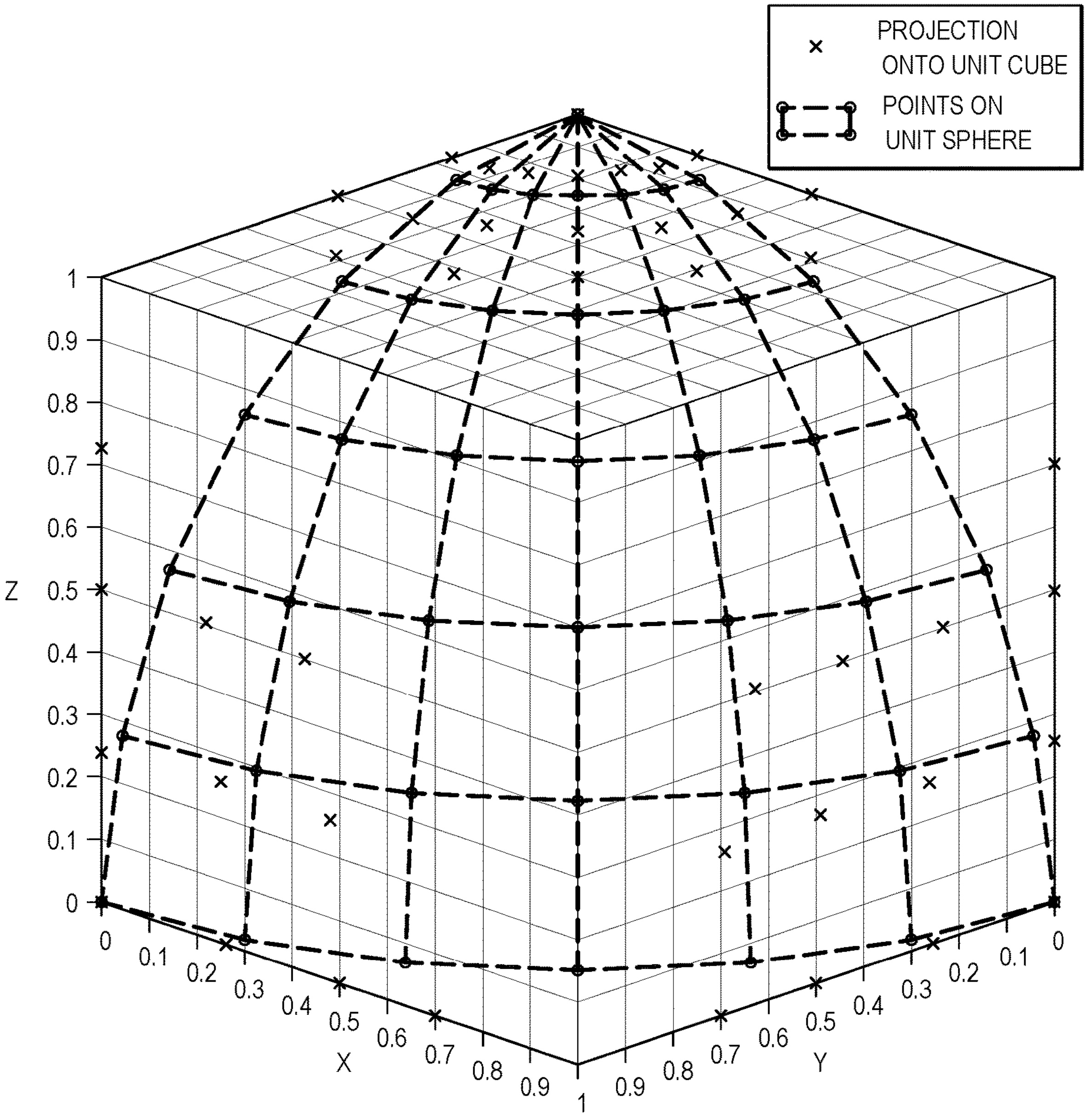

Various techniques may be used to identify a point from the set of points to which an angle is to be quantized. For example, in some implementations, a Cartesian representation of the angle to be quantized may be projected, along with the set of points, onto a unit cube. Continuing with this example, in some implementations, a two-dimensional distance calculation may be used to identify a point of the subset of points on the face of the unit cube on which the Cartesian representation of the angle has been projected. This technique may reduce the search for the point by a factor of 6 relative to searching over the entire set of points. FIG. 4C shows an example of a set of points from an octant of a sphere (e.g., the octant corresponding to x, y, and z>0) projected onto a unit cube (e.g., the faces x=1, y=1, z=1), where the circles represent points from the octant of the sphere, and the X's represent projections onto the cube.

As another example, in some implementations, the Cartesian representation of the angle to be quantized may be used to select a particular three-dimensional octant of the sphere. Continuing with this example, a three-dimensional distance calculation may be used to identify a point from within the selected three-dimensional octant. This technique may reduce the search for the point by a factor of 8 relative to searching over the entire set of points. As yet another example, in some implementations, the above two techniques may be combined such that the point is identified from the set of points by performing a two-dimensional distance search over the subset of points in a two-dimensional octant of the face of the cube on which the Cartesian representation of the angle to be quantized is projected. This technique may reduce the search for the point by a factor of 24 relative to searching over the entire set of points.

In some implementations, rather than quantizing an angle by identifying a point of a set of points that is closest to the angle to be quantized, the angle may be quantized by projecting a unit vector representing the Cartesian representation of the angle on the face of a unit cube, and quantizing and encoding the projection. In one example, the unit vector representing the Cartesian representation of the angle may be represented as (x, y, z). Continuing with this example, the unit vector may be projected onto the unit cube to determine a projected point (x', y', z'), where:

$$x' = \frac{x}{\max(|x|, |y|, |z|)}$$

$$y' = \frac{y}{\max(|x|, |y|, |z|)}$$

$$z' = \frac{z}{\max(|x|, |y|, |x|)}$$

Given the above, x', y', and z' may have values within a range of (−1, 1), and the values may then be quantized uniformly. For example, quantizing the values within the range of about (−0.9, 0.9), e.g., with a step size of 0.2, may allow duplicate points on the edges of the unit cube to be avoided.

In some implementations, an encoder may perform a two-step rotation of sound components to align with a directionally-preferred axis by rotating the sound components around a first axis, and then subsequently around a second axis. For example, in an instance in which the directionally-preferred axis is the Y axis, the encoder may rotate the sound components around the Z axis, and then around the X axis, such that after the two rotation steps, the dominant sound component is directionally aligned with the Y axis.

Figure 5A:
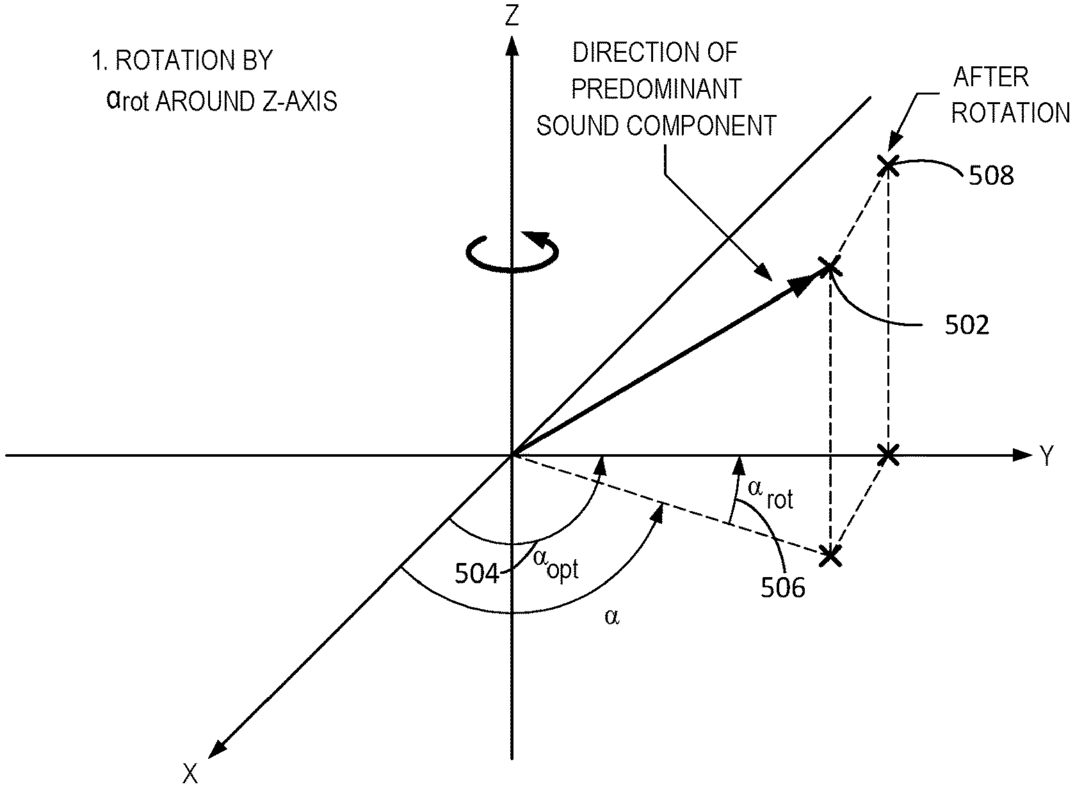
FIGS. 5A and 5B are schematic diagrams that illustrate a two-step rotation technique for a sound component in accordance with some implementations.

An example of such a two-step rotation is shown in and described below in connection with FIGS. 5A and 5B. Referring to FIG. 5A, a dominant sound component is positioned at 502 at spherical coordinates (α, β). The value of $\alpha_{opt}$ 504 corresponds to an angle between the positive x-axis and the positive y-axis, indicating a directional preference of the coding scheme that is aligned with the Y axis. The value of $\alpha_{rot}$ 506 can then be determined as a difference between $\alpha_{opt}$ and α, where $\alpha_{rot}$ indicates an amount of azimuthal rotation needed to align the dominant sound component with $\alpha_{opt}$ (e.g., the positive Y axis). After rotation by $\alpha_{rot}$, the dominant sound component is at position 508.

Figure 5B:
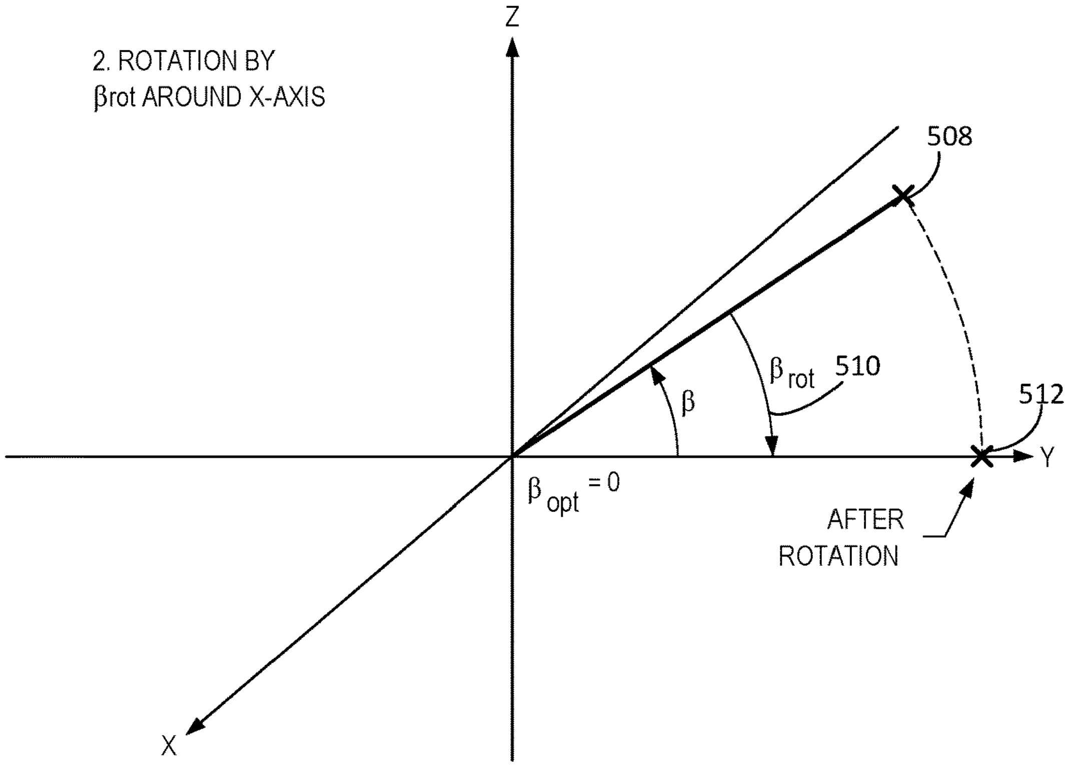

The second step of the two-step rotation is depicted in FIG. 5B. In the second step, the sound components are rotated around the X axis. As illustrated, the value of $\beta_{opt}$ is 0, corresponding to the positive y-axis. The value of $\beta_{rot}$ 510 can then be determined as a difference between $\beta_{opt}$ (e.g., 0), and β. After rotation, the dominant sound component is at location 512.

Figure 6:
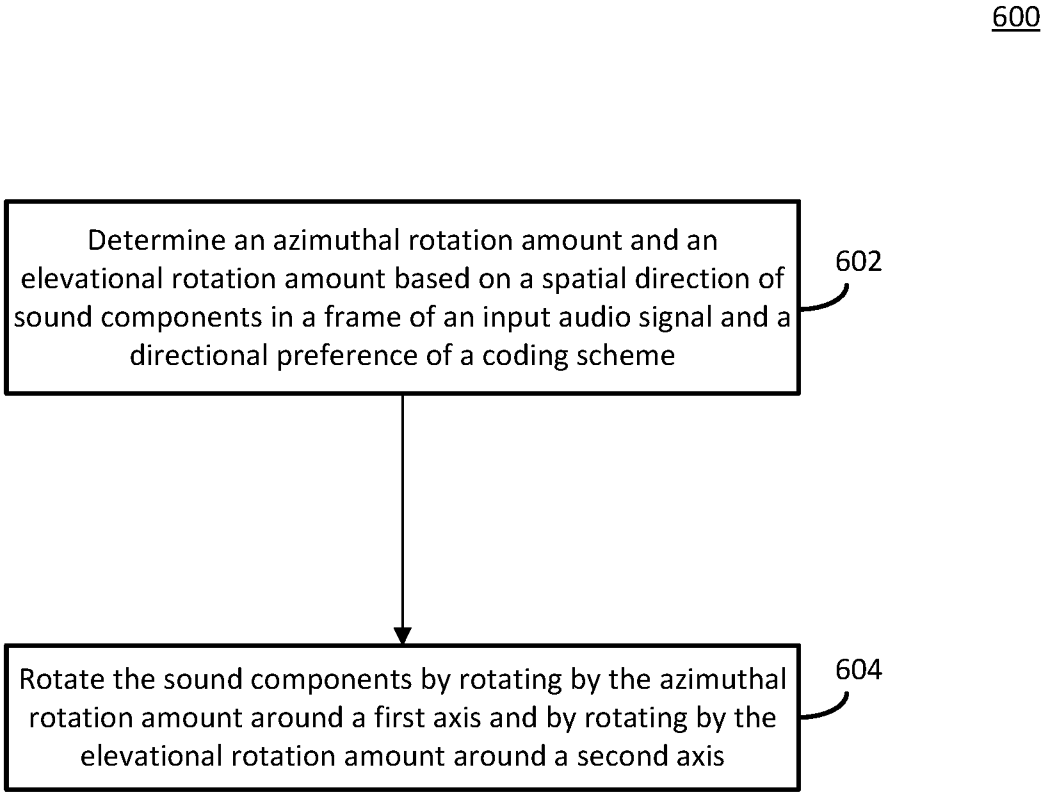
FIG. 6 is a flowchart depicting an example process for performing a two-step rotation technique in accordance with some implementations.

FIG. 6 shows a flowchart of an example process 600 for performing a rotation of sound components using the two-step rotation technique shown in and described above in connection with FIGS. 5A and 5B. In some implementations, blocks of process 600 may be performed by an encoder.

Process 600 may begin at 602 by determining an azimuthal rotation amount (e.g., $\alpha_{rot}$) and an elevational rotation amount (e.g., $\beta_{rot}$). The azimuthal rotation amount and the elevational rotation amount may be determined based on a spatial direction of the dominant sound component in a frame of an input audio signal and a directional preference of a coding scheme to be used to encode the input audio signal. For example, in an instance in which the directional preference of the coding scheme is the Y axis, the azimuthal rotation amount may indicate a rotation amount around the Z axis and the elevational rotation amount may indicate a rotation amount around the X axis. As a more particular example, given a directional preference of $\alpha_{opt}$ and $\beta_{opt}$ for a dominant sound component positioned at (α, β), an azimuthal rotation amount $\alpha_{rot}$ and an elevational rotation amount $\beta_{rot}$ may be determined by:

$$\alpha_{rot} = \alpha_{opt} - \alpha;\text{ and }\beta_{rot} = \beta_{opt} - \beta$$

In some implementations, because $\alpha_{opt}$+90° may also align with the preferred direction of the coding scheme (e.g., corresponding to the negative Y axis) and because azimuthal rotation may be performed in either the clockwise or counterclockwise direction about the Z axis, the value of $\alpha_{rot}$ may be constrained to within a range of [−90°, 90° ]. By determining $\alpha_{rot}$ within a range of [−90°, 90° ] rather than constraining $\alpha_{rot}$ to rotate only in one direction about the Z axis, rotation angles within the range of [90°, 270° ] may not occur. Accordingly, in such implementations, an extra bit may be saved when quantizing the value of $\alpha_{rot}$ (e.g., as described below in connection with block 208). In some implementations, the value of $\alpha_{rot}$ can be determined within the range of [−90°, 90° ] by finding the value of the integer index k for which $|\alpha_{opt}-\alpha+k*180°|$ is minimized. Then, $\alpha_{rot}$ may be determined by:

$$\alpha_{rot} = \alpha_{opt} - \alpha + k_{opt} * 180$$

It should be noted that, in some implementations, a rotation angle may be determined as a differential value relative to a rotation that was performed on the preceding frame. By way of example, in an instance in which an azimuthal rotation of $\alpha'_{rot}$ was performed on the preceding frame, a differential azimuthal rotation to be performed on the current frame may be determined by: $\alpha^{+}_{rot}=\alpha_{rot}-\alpha'_{rot}$. In some implementations, the total rotation angle $\alpha_{rot}$ may be encoded as a rotation parameter and provided to the decoder for reverse rotation, thereby ensuring that even if the encoder and the decoder become desynchronized, the decoder can still accurately perform a reverse rotation of the sound components.

It should be noted that, in some implementations, the azimuthal rotation amount and the elevational rotation amount may be quantized values (e.g., $\alpha_{rot,\ q}$ and $\beta_{rot,\ q}$), which may be quantized using one or more of the quantization techniques described above.

At 604, process 600 can rotate the sound components by rotating the sound components by the azimuthal rotation amount around a first axis and by rotating the sound components by the elevational rotation amount around a second axis. Continuing with the example given above, process 600 can rotate the sound components by $\alpha_{rot}$ (or, for a quantized angle, $\alpha_{rot,\ q}$) around the Z axis, and by $\beta_{rot}$ (or, for a quantized angle $\beta_{rot,\ q}$) around the X axis.

In some implementations, the rotation around the first axis and the second axis may be accomplished using a matrix multiplication. For example, given an azimuthal rotation amount of $\alpha_{rot,\ q}$ and an elevational rotation amount of $\beta_{rot,\ q}$ matrices $R_\alpha$ and $R_\beta$ are defined as:

$$R_\alpha = \begin{bmatrix} \cos\alpha_{rot,q} & -\sin\alpha_{rot,q} & 0 \\ \sin\alpha_{rot,q} & \cos\alpha_{rot,q} & 0 \\ 0 & 0 & 1 \end{bmatrix}$$

$$R_\beta = \begin{bmatrix} 1 & 0 & 0 \\ 0 & \cos\beta_{rot,q} & -\sin\beta_{rot,q} \\ 0 & \sin\beta_{rot,q} & \cos\beta_{rot,q} \end{bmatrix}$$

Given a frame of an input audio signal having FOA components of:

$$F_{in} = \begin{bmatrix} W_{in} \\ X_{in} \\ Y_{in} \\ Z_{in} \end{bmatrix}$$

The rotated X, Y, and Z components, represented as $X_{rot}$, $Y_{rot}$, and $Z_{rot}$, respectively, may be determined by:

$$\begin{bmatrix} X_{rot} \\ Y_{rot} \\ Z_{rot} \end{bmatrix} = R_\beta * R_\alpha * \begin{bmatrix} X_{in} \\ Y_{in} \\ Z_{in} \end{bmatrix}$$

Because the W component (e.g., representing the omnidirectional signal) is not rotated, the rotated FOA signal may then be represented as:

$$F_{rot} = \begin{bmatrix} W_{in} \\ X_{rot} \\ Y_{rot} \\ Z_{rot} \end{bmatrix}$$

At the decoder, after extracting the encoded rotated components from the bit stream, the decoder can reverse the rotation of the sound components by applying rotations in the reverse angles. For example, given $R_{-\alpha}$ and $R_{-\beta}$ defined as:

$$R_{-\alpha} = \begin{bmatrix} \cos\alpha_{rot,q} & \sin\alpha_{rot,q} & 0 \\ -\sin\alpha_{rot,q} & \cos\alpha_{rot,q} & 0 \\ 0 & 0 & 1 \end{bmatrix}$$

$$R_{-\beta} = \begin{bmatrix} 1 & 0 & 0 \\ 0 & \cos\beta_{rot,q} & \sin\beta_{rot,q} \\ 0 & -\sin\beta_{rot,q} & \cos\beta_{rot,q} \end{bmatrix}$$

The encoded rotated components may be reverse rotated by applying a reverse rotation around the X axis by the elevational angle amount and around the Z axis by the azimuthal angle amount. For example, the reverse rotated FOA signal $F_{out}$ may be represented as:

$$F_{out} = \begin{bmatrix} W_{out} \\ X_{out} \\ Y_{out} \\ Z_{out} \end{bmatrix}$$

$X_{out}$, $Y_{out}$, and $Z_{out}$, representing the reverse rotated X, Y, and Z components of the FOA signal, may be determined by:

$$\begin{bmatrix} X_{out} \\ Y_{out} \\ Z_{out} \end{bmatrix} = R_{-\alpha} * R_{-\beta} * \begin{bmatrix} X_{rot} \\ Y_{rot} \\ Z_{rot} \end{bmatrix}$$

In the above, in an instance in which the Y component was waveform encoded by the encoder and in which the X and Z components were parametrically encoded by the encoder, $X_{rot}$ and $Z_{rot}$ may correspond to reconstructed X and Z components that are still rotated, where the reconstruction was performed by the decoder using the parametric metadata.

In some implementations, an encoder may rotate sound components around an axis perpendicular to a plane formed by the dominant sound component and an axis corresponding to the directional preference of the coding scheme. For example, in an instance in which the dominant sound component is denoted as P, and in which the direction preference of the coding scheme is along the Y axis, the axis (generally represented herein as N) is perpendicular to the P×Y plane.

It should be noted that, in some instances, rotation of sound components about an axis perpendicular to the plane formed by the dominant sound component and the axis corresponding to the directional preference of the coding scheme may provide an advantage in providing consistent rotations for dominant sound components that are near the Z axis but in different quadrants. By way of example, using the two-step rotation process, two dominant sound components near the Z axis but in different quadrants may be rotated by substantially different rotation angles around the Z axis (e.g., $\alpha_{rot}$ may be substantially different for the two points). Conversely, by rotating around an axis perpendicular to a plane formed by the dominant sound component and an axis corresponding to the directional preference of the coding scheme, rotation angles Θ may remain relatively similar for both points. Using similar rotation angles for points that are relatively close together may improve sound perception, e.g., by avoiding rotating audio signal components that would benefit from waveform encoding onto the X and/or Z axes, when the audio signal components along these axes are parametrically encoded.

Figure 7:
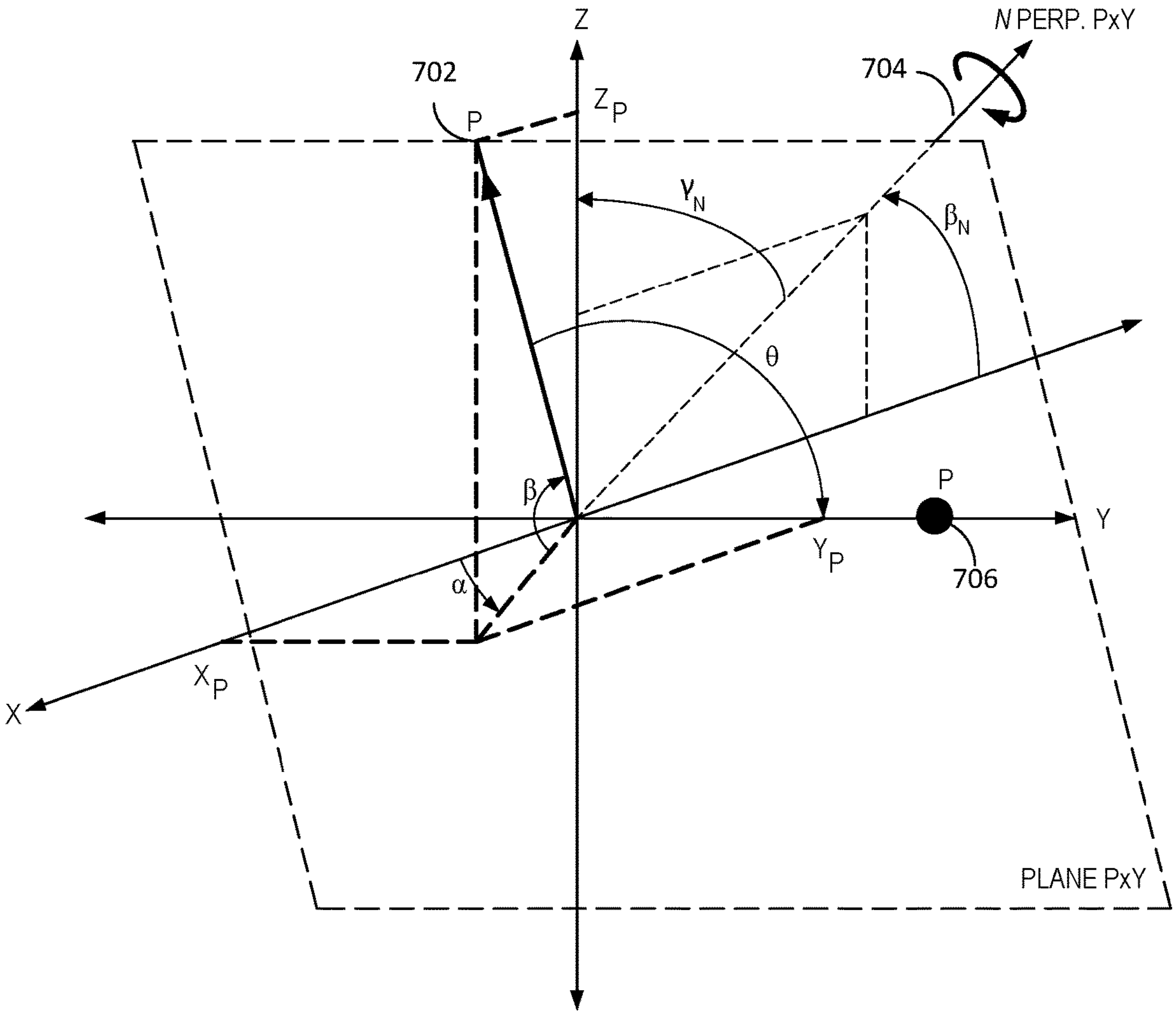
FIG. 7 is a schematic diagram that illustrates a great circle rotation technique for a sound component in accordance with some implementations.

FIG. 7 illustrates a schematic diagram of rotation of a dominant sound component around an axis perpendicular to the P×Y plane, where it is again assumed that the directional preference of the coding scheme aligns with the Y axis. As illustrated in FIG. 7, dominant sound component 702 (denoted as P) is located at spherical coordinates (α, β). Axis 704 is the axis N, which is perpendicular to the plane formed by P and the Y axis. The perpendicular axis N (e.g., axis 704 of FIG. 7) may be determined as the cross-product of a vector associated with the dominant sound component P and a vector associated with the directional preference of the coding scheme. For example, in an instance in which the directional preference of the coding scheme corresponds to the Y axis, the axis N may be determined by:

$$N = \begin{pmatrix} \sin\beta \\ 0 \\ -\cos\alpha \cdot \cos\beta \end{pmatrix}$$

The angle $\beta_N$ indicates an angle of elevation of axis 704 (e.g., of axis N). The angle $\gamma_N$ indicates an angle of inclination between axis 704 (e.g., axis N) and the Z axis. It should be noted that $\gamma_N$ is $90°-\beta_N$. The angle through which to rotate around axis N is represented as Θ. In some implementations, Θ may be determined by the angle between a vector to point P and a vector corresponding to the Y axis. For example, Θ=arccos (P·Y). Accordingly, the rotation may be performed by first rotating about the Y axis by $\gamma_N$ to bring axis N in line with the Z axis, then rotating about the Z axis by Θ to bring the dominant sound component in line with the Y axis, and then subsequently reverse rotating the dominant sound component about the Y axis by $-\gamma_N$ to return axis N back to its original position as perpendicular to the original P×Y plane. After rotation, the dominant sound component P is now at position 706, as illustrated in FIG. 7, e.g., in line with the Y axis. It should be noted that in some implementations, rotation by Θ around the perpendicular axis N may alternatively be performed using quaternions.

FIG. 8 shows a flowchart of an example process 800 for rotating sound components around an axis perpendicular to a plane formed by the dominant sound component and an axis corresponding to the directional preference of the coding scheme. In particular, process 800 describes a technique for performing a rotation by an angle Θ about an axis N (e.g., that is perpendicular to a plane formed by the dominant sound component and the axis corresponding to the directional preference) using a three-step technique to apply the rotation by Θ. Note that although the examples given in FIG. 8 assume a directional preference of the Y axis, the techniques described below may be applied to a directional preference along any axis. In some implementations, blocks of process 800 may be executed by an encoder.

Process 800 may begin at 802 by identifying, for a point P representing a location of a dominant sound component of a frame of an input audio signal in three-dimensional space, an inclination angle (e.g., $\gamma_N$) of an axis N that is perpendicular to a plane formed by P and an axis corresponding to the directional preference, and an angle (e.g., Θ) through which to rotate the point P about axis N. By way of example, in an instance in which the directional preference corresponds to the Y axis, the plane may be the P×Y plane, and the perpendicular axis may be an axis N which is perpendicular to the P×Y plane. Such an axis is depicted and described above in connection with FIG. 7. The inclination angle may be determined based on an angle of inclination between the perpendicular axis N and the Z axis. The angle Θ by which the point P (e.g., the dominant sound component) is to be rotated about the perpendicular axis N may be determined based on an angle between a vector formed by the point P and a vector corresponding to the axis of directional preference (e.g., the Y axis). It should be noted that the angle Θ may be quantized (e.g., as $\Theta_q$) using one or more of the quantization techniques described above).

At 804, process 800 may perform the rotation by rotating by the inclination angle around the Y axis corresponding to the directional preference, rotating about the Z axis by the angle Θ, and reversing the rotation by the inclination angle around the Y axis. By way of example, process 800 may rotate by $\gamma_N$ around the Y axis, by Θ around the Z axis, and then by $-\gamma_N$ around the Y axis. After this sequence, the point P (e.g., the dominant sound component) may be aligned with the Y axis, e.g., corresponding to the directional preference.

By way of example, assuming a directional preference corresponding to the Y axis and a quantized angle of rotation about axis N of $\Theta_q$, $R_\gamma$ and $R_{\Theta,q}$ may be given by:

$$R_\gamma = \begin{bmatrix} \cos\gamma_N & 0 & -\sin\gamma_N \\ 0 & 1 & 0 \\ \sin\gamma_N & 0 & \cos\gamma_N \end{bmatrix}$$

$$R_{\theta,q} = \begin{bmatrix} \cos\theta_q & -\sin\theta_q & 0 \\ \sin\theta_q & \cos\theta_q & 0 \\ 0 & 0 & 1 \end{bmatrix}$$

It should be noted that, for readability, in the equations given above, the inclination angle $\gamma_N$ is indicated as not quantized, however, $\gamma_N$ may be quantized, for example, using any of the techniques described herein.

Continuing with this example, given a FOA signal having components $W_{in}$, $X_{in}$, $Y_{in}$, and $Z_{in}$, a rotation of the X, Y, and Z components may be performed to determine rotated components $X_{rot}$, $Y_{rot}$, and $Z_{rot}$, which may be determined by:

$$\begin{bmatrix} X_{rot} \\ Y_{rot} \\ Z_{rot} \end{bmatrix} = R_\gamma^{-1} * R_{\theta,q} * R_\gamma * \begin{bmatrix} X_{in} \\ Y_{in} \\ Z_{in} \end{bmatrix}$$

It should be noted that, the W component, corresponding to the omnidirectional signal, remains the same.

At the decoder, given $X_{rot}$, $Y_{rot}$, and $Z_{rot}$, the rotation may be reversed by:

$$\begin{bmatrix} X_{out} \\ Y_{out} \\ Z_{out} \end{bmatrix} = R_{\gamma}^{-1} * R_{-\theta,q} * R_{\gamma} * \begin{bmatrix} X_{rot} \\ Y_{rot} \\ Z_{rot} \end{bmatrix}$$

In the equation given above, $R_{-\Theta,q}$ applies a rotation around the Z axis by −Θ. In other words, $R_{-\Theta,q}$ reverses the rotation around the Z axis. It should be noted that, in an instance in which the rotated X and Z components were parametrically encoded by the encoder, $X_{rot}$, and $Z_{rot}$, may correspond to reconstructed rotated components which have been reconstructed by the decoder using parametric metadata provided by the encoder.

In some implementations, rotation of sound components may be performed by various blocks and/or at various levels of a codec (e.g., the IVAS codec). For example, in some implementations, rotation of sound components may be performed prior to an encoder (e.g., a SPAR encoder) downmixing channels. Continuing with this example, the sound components may be reverse rotated after upmixing the channels (e.g., by a SPAR decoder).

Figure 10A:
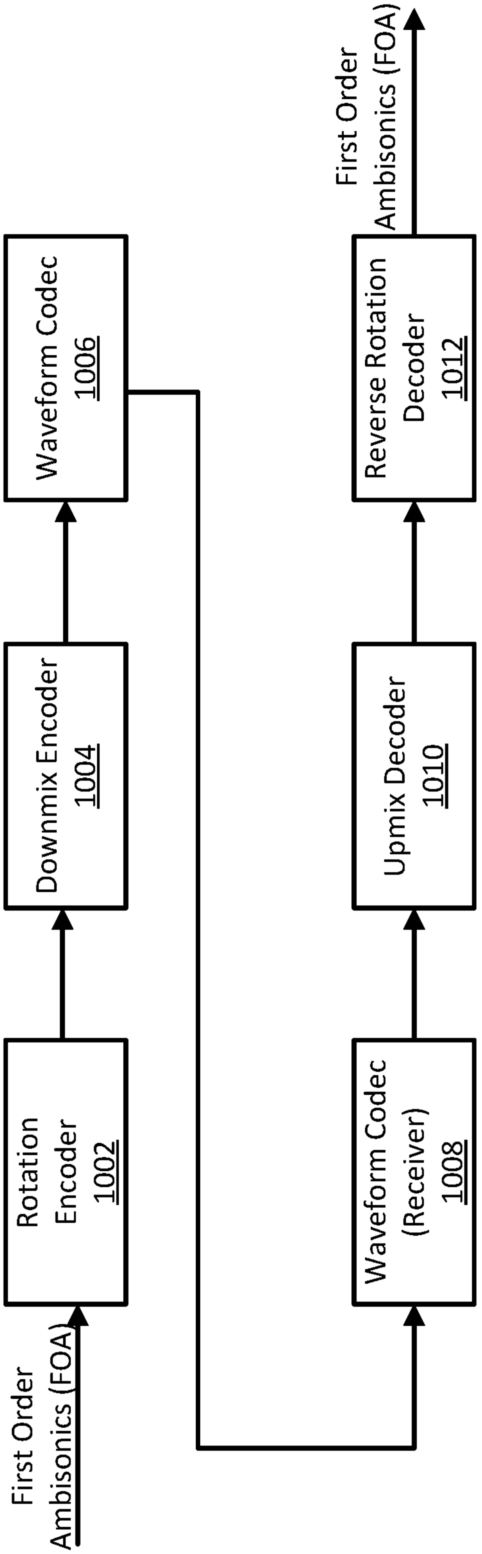
FIGS. 10A, 10B, and 10C are schematic diagrams that illustrate various system configurations for rotating sound components in alignment with a directional preference of a coding scheme in accordance with some implementations.

An example system diagram for rotating sound components prior to downmixing channels is shown in FIG. 10A. As illustrated, a rotation encoder 1002 may receive a FOA signal. The FOA signal may have 4 channels, e.g., W, X, Y, and Z. Rotation encoder 1002 may perform rotation of sound components of the FOA signal, for example, to align a direction of the dominant sound component of the FOA signal with a directional preference of a coding scheme used by a downmix encoder 1004. Downmix encoder 1004 may receive the rotated sound components (e.g., W, $X_{rot}$, $Y_{rot}$, and $Z_{rot}$) and may downmix the four channels to a reduced number of channels by waveform encoding a subset of the components and parametrically encoding the remaining components. In some implementations, downmix encoder 1004 may be a SPAR encoder. Waveform codec 1006 may then receive the reduced number of channels and encode the information associated with the reduced number of channels in a bit stream. The bit stream may additionally include rotation parameters used by rotation encoder 1002. In some implementations, waveform codec 1006 may be an Enhanced Voice Services (EVS) encoder.

At a receiver, a waveform codec 1008 may receive the bit stream and decode the bit stream to extract the reduced channels. In some implementations, bit stream decoder 1008 may be an EVS decoder. In some implementations waveform codec 1008 may additionally extract the rotation parameters. An upmix decoder 1010 may then upmix the reduced channels by reconstructing the encoded components. For example, upmix decoder 1010 may reconstruct one or more components that were parametrically encoded by downmix decoder 1004. In some implementations, upmix decoder 1010 may be a SPAR decoder. A reverse rotation decoder 1012 may then reverse the rotation, for example, utilizing the extracted rotation parameters to reconstruct the FOA signal. The reconstructed FOA signal may then be rendered.

In some implementations, rotation may be performed by a downmix encoder (e.g., by a SPAR encoder). Continuing with this example, the sound components may be reverse rotated by an upmixing decoder (e.g., by a SPAR decoder). In some instances, this implementation may be advantageous in that techniques for rotating sound components (or reverse rotating the sound components) may utilize processes that are already implemented by and/or executed by the downmix encoder or the upmix decoder. For example, a downmix encoder may perform various cross-fading techniques from one from to a successive frame. Continuing with this example, in an instance in which the downmix encoder performs cross-fading between successive frames and in which the downmix encoder itself performs rotation of sound components, the downmix encoder may not need to interpolate between samples of frames, due to the cross-fading between frames. In other words, the smoothing advantages provided by performing cross-fading may be leveraged to reduce computational complexity by not performing additional interpolation processes. Moreover, because a downmix encoder may perform cross-fading on a frequency band by frequency band basis, utilizing the downmix encoder to perform rotation may allow rotation to be performed differently for different frequency bands rather than applying the same rotation to all frequency bands.

Figure 10B:
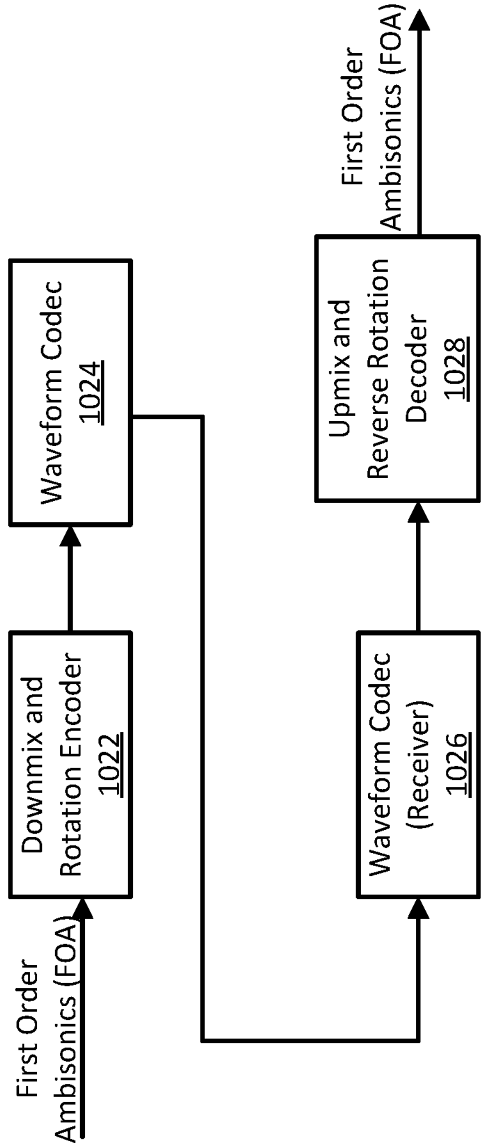

An example system diagram for rotating sound components by a downmix encoder is shown in FIG. 10B. As illustrated, a downmix and rotation encoder 1022 may receive a FOA signal. The FOA signal may have 4 channels, e.g., W, X, Y, and Z. Downmix and rotation encoder 1022 may perform both rotation and downmixing on the FOA signal. A more detailed description of such a downmix and rotation encoder 1022 is shown in and described below in connection with FIG. 10C. In some implementations, downmix and rotation encoder 1022 may be a SPAR encoder. An output of downmix and rotation encoder 1022 may be, in an instance of downmixing to two channels, for example, W and $Y_{rot}$, indicating an omnidirectional component and a rotated Y component that have been waveform encoded and parametric data usable to reconstruct the remaining X and Z components that have been parametrically encoded. A waveform codec 1024 may receive the downmixed and rotated sound components and encode the downmixed and rotated sound components in a bit stream. The bit stream may additionally include an indication of the rotation parameters used to perform the rotation. In some implementations, waveform codec 1024 is an EVS encoder.

At a receiver, a waveform codec 1026 may receive the bit stream and extract the downmixed and rotated sound components. For example, in an instance in which the FOA signal has been downmixed to two channels, waveform codec 1026 may extract W and $Y_{rot}$ components and extract parametric metadata used to parametrically encode the X and Z components. In some implementations, waveform codec 1026 may extract the rotation parameters. In some implementations, waveform codec 1026 may be an EVS decoder. An upmix and reverse rotation decoder 1028 may take the extracted downmixed and rotated sound components and reverse the rotation of the sound components, as well as upmix the channels (e.g., by reconstructing parametrically encoded components). For example, an output of upmix and reverse rotation decoder 1028 may be a reconstructed FOA signal. The reconstructed FOA signal may then be rendered.

Figure 10C:
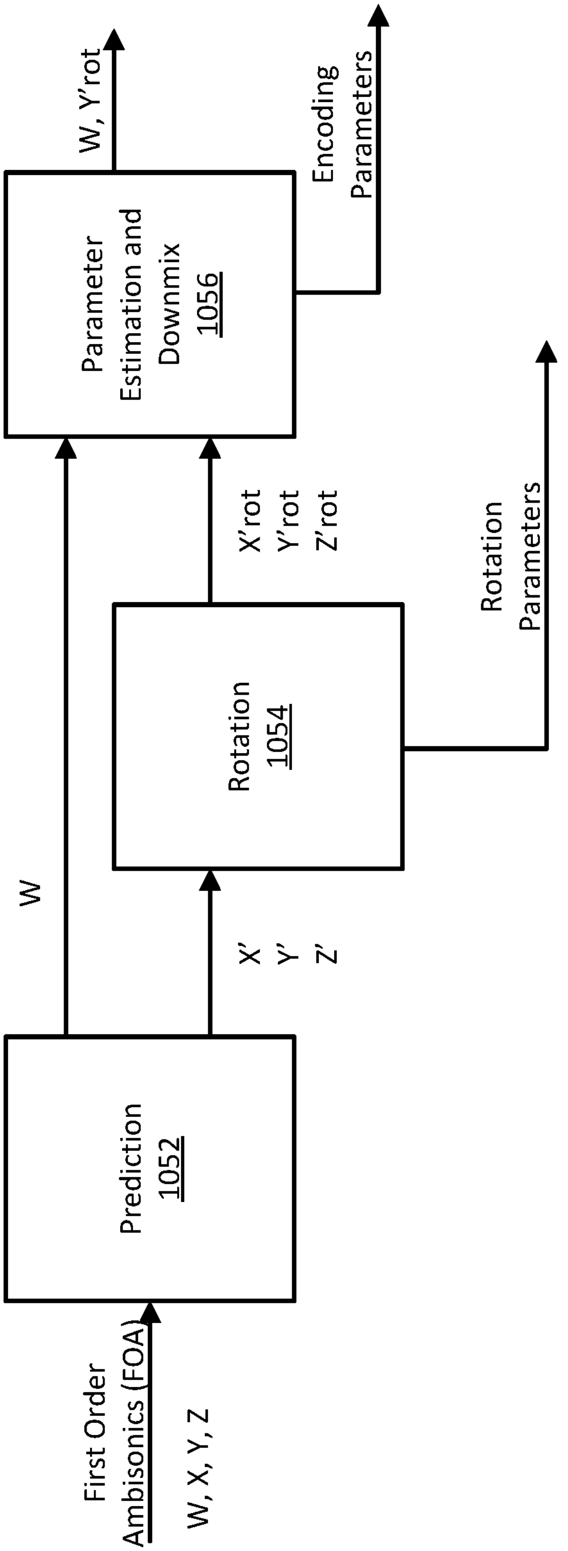

Turning to FIG. 10C, a schematic diagram of an example downmix and rotation encoder (e.g., downmix and rotation encoder 1022 as shown in and described above in connection with FIG. 10B) is shown in accordance with some implementations. As illustrated, a FOA signal, which includes W, X, Y, and Z components is provided to a covariance estimation, and prediction component 1052. Component 1052 may generate a covariance matrix that indicates a direction of the dominant sound component of the FOA signal. Component 1052 may use estimated covariance values to generate residuals for the directional components, which are represented in FIG. 10C as X', Y', and Z'.

A rotation component 1054 may perform rotation on the residual components to generate $X'_{rot}$ $Y'_{rot}$, and $Z'_{rot}$. Rotation component 1054 may additionally generate rotation parameters that are utilized by a bit stream encoder (not shown) to multiplex information indicative of the rotation parameters to the bit stream. A parameter estimate and downmix component 1056 may take as input W, $X'_{rot}$, $Y'_{rot}$, and $Z'_{rot}$ and generate a downmixed set of channels (e.g., W and $Y'_{rot}$) as well as parametric metadata for parametrically encoding $X'_{rot}$ and $Z'_{rot}$.

It should be noted that, in some implementations, a downmix and rotation encoder (e.g., downmix and rotation encoder 1022 as shown in and described above in connection with FIG. 10B) may adapt a direction preference of the coding scheme rather than rotating sound components to align with the direction preference of the coding scheme. For example, in some implementations, such an encoder may determine a spatial direction of a dominant sound component in a frame of an input audio signal. Continuing with this example, in some implementations, the encoder may modify a direction preference of the coding scheme such that the modified direction preference aligns with the spatial direction of the dominant sound component. As a more particular example, in some implementations, the encoder may determine rotation parameters to rotate the direction preference of the coding scheme such that the rotated direction preference is aligned with the spatial direction of the dominant sound component. In some implementations, any of the techniques described above for determining rotation parameters may be utilized. In some implementations, the modified direction preference may be a quantized direction preference, where quantization may be performed using any of the techniques described above. Continuing further with this example, the encoder may encode sound components of the frame using an adapted coding scheme, where the adapted coding scheme has a direction preference (e.g., the modified direction preference) aligned with the spatial direction of the dominant sound component. In some implementations, information indicating the modified direction preference associated with the coding scheme used to encode the sound components of the frame may be encoded such that a decoder can utilize the information indicative of the modified direction preference to decode the sound components. For example, in some implementations, the decoder may decode received information to obtain the modified direction preference utilized by the encoder. The decoder may then adapt itself based on the modified direction preference, e.g., such that the decoder direction preference is aligned with the encoder direction preference. The adapted decoder may then decode received sound components, which may then be rendered and/or played back. It should be noted that, in instances in which the spatial direction of the coding scheme is itself modified or adapted, any of the smoothing techniques described above may be utilized to smooth changes in direction preference of the coding scheme from one frame to another.

Figure 11:
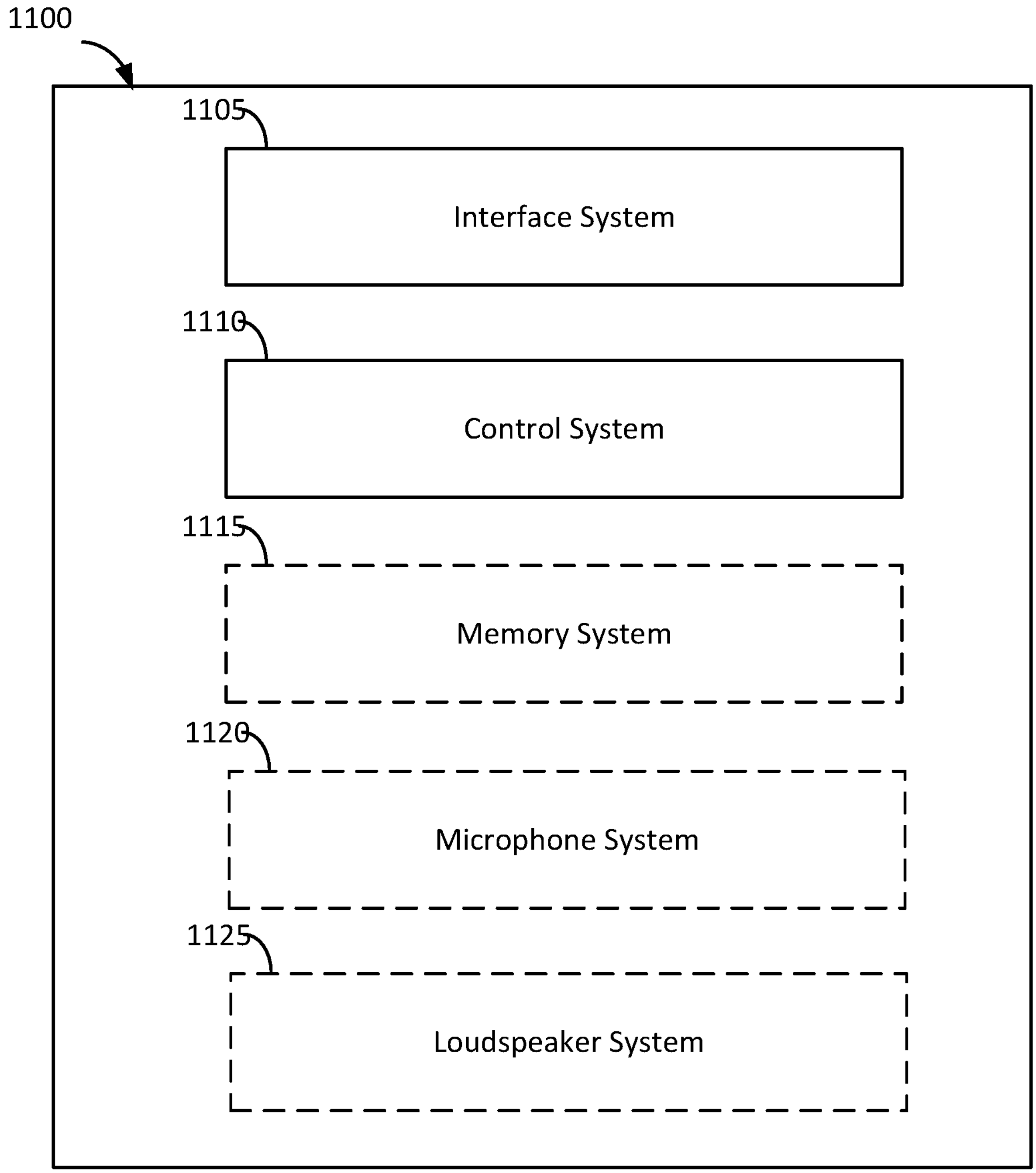
FIG. 11 shows a block diagram that illustrates examples of components of an apparatus capable of implementing various aspects of this disclosure.

FIG. 11 is a block diagram that shows examples of components of an apparatus capable of implementing various aspects of this disclosure. As with other figures provided herein, the types and numbers of elements shown in FIG. 11 are merely provided by way of example. Other implementations may include more, fewer and/or different types and numbers of elements. According to some examples, the apparatus 1100 may be configured for performing at least some of the methods disclosed herein. In some implementations, the apparatus 1100 may be, or may include, a television, one or more components of an audio system, a mobile device (such as a cellular telephone), a laptop computer, a tablet device, a smart speaker, or another type of device.

According to some alternative implementations the apparatus 1100 may be, or may include, a server. In some such examples, the apparatus 1100 may be, or may include, an encoder. Accordingly, in some instances the apparatus 1100 may be a device that is configured for use within an audio environment, such as a home audio environment, whereas in other instances the apparatus 1100 may be a device that is configured for use in "the cloud," e.g., a server.

In this example, the apparatus 1100 includes an interface system 1105 and a control system 1110. The interface system 1105 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 1105 may, in some implementations, be configured for exchanging control information and associated data with audio devices of the audio environment. The control information and associated data may, in some examples, pertain to one or more software applications that the apparatus 1100 is executing.

The interface system 1105 may, in some implementations, be configured for receiving, or for providing, a content stream. The content stream may include audio data. The audio data may include, but may not be limited to, audio signals. In some instances, the audio data may include spatial data, such as channel data and/or spatial metadata. In some examples, the content stream may include video data and audio data corresponding to the video data.

The interface system 1105 may include one or more network interfaces and/or one or more external device interfaces (such as one or more universal serial bus (USB) interfaces). According to some implementations, the interface system 1105 may include one or more wireless interfaces. The interface system 1105 may include one or more devices for implementing a user interface, such as one or more microphones, one or more speakers, a display system, a touch sensor system and/or a gesture sensor system. In some examples, the interface system 1105 may include one or more interfaces between the control system 1110 and a memory system, such as the optional memory system 1115 shown in FIG. 11. However, the control system 1110 may include a memory system in some instances. The interface system 1105 may, in some implementations, be configured for receiving input from one or more microphones in an environment.

The control system 1110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 1110 may reside in more than one device. For example, in some implementations a portion of the control system 1110 may reside in a device within one of the environments depicted herein and another portion of the control system 1110 may reside in a device that is outside the environment, such as a server, a mobile device (e.g., a smartphone or a tablet computer), etc. In other examples, a portion of the control system 1110 may reside in a device within one environment and another portion of the control system 1110 may reside in one or more other devices of the environment. For example, a portion of the control system 1110 may reside in a device that is implementing a cloud-based service, such as a server, and another portion of the control system 1110 may reside in another device that is implementing the cloud-based service, such as another server, a memory device, etc. The interface system 1105 also may, in some examples, reside in more than one device.

In some implementations, the control system 1110 may be configured for performing, at least in part, the methods disclosed herein. According to some examples, the control system 1110 may be configured for implementing methods of rotating sound components, encoding rotated sound components and/or rotation parameters, decoding encoded information, reversing a rotation of sound components, rendering sound components, or the like.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 915 shown in FIG. 11 and/or in the control system 1110. Accordingly, various innovative aspects of the subject matter described in this disclosure can be implemented in one or more non-transitory media having software stored thereon. The software may, for example, include instructions for rotating sound components, reversing a rotation of sound components, etc. The software may, for example, be executable by one or more components of a control system such as the control system 1110 of FIG. 11.

In some examples, the apparatus 1100 may include the optional microphone system 1120 shown in FIG. 11. The optional microphone system 1120 may include one or more microphones. In some implementations, one or more of the microphones may be part of, or associated with, another device, such as a speaker of the speaker system, a smart audio device, etc. In some examples, the apparatus 1100 may not include a microphone system 1120. However, in some such implementations the apparatus 1100 may nonetheless be configured to receive microphone data for one or more microphones in an audio environment via the interface system 1110. In some such implementations, a cloud-based implementation of the apparatus 1100 may be configured to receive microphone data, or a noise metric corresponding at least in part to the microphone data, from one or more microphones in an audio environment via the interface system 1110.

According to some implementations, the apparatus 1100 may include the optional loudspeaker system 1125 shown in FIG. 11. The optional loudspeaker system 1125 may include one or more loudspeakers, which also may be referred to herein as "speakers" or, more generally, as "audio reproduction transducers." In some examples (e.g., cloud-based implementations), the apparatus 1100 may not include a loudspeaker system 1125. In some implementations, the apparatus 1100 may include headphones. Headphones may be connected or coupled to the apparatus 1100 via a headphone jack or via a wireless connection (e.g., BLUETOOTH).

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. A method for encoding scene-based audio, comprising:

determining, by an encoder, a spatial direction of a dominant sound component in a frame of an input audio signal;

determining, by the encoder, rotation parameters based on the determined spatial direction and a direction preference of a coding scheme to be used to encode the input audio signal, wherein the direction preference of the coding scheme corresponds to the direction of a direction dependent component in an audio signal that is waveform encoded;

rotating sound components of the frame of the input audio signal based on the rotation parameters such that, after being rotated, the dominant sound component has a spatial direction that aligns with the direction preference of the coding scheme, wherein rotating the sound components comprises:

determining a first rotation amount and a second rotation amount for the sound components based on the spatial direction of the dominant sound component and the direction preference of the coding scheme; and rotating the sound components around a first axis by the first rotation amount and around a second axis by said second rotation amount such that the sound components, after rotation, are aligned with a third axis corresponding to the direction preference of the coding scheme; and encoding the rotated sound components of the frame of the input audio signal using the coding scheme in connection with an indication of the rotation parameters or an indication of the spatial direction of the dominant sound component, wherein the rotated sound components and the indication of the rotation parameters are usable by a decoder to reverse the rotation of the sound components prior to rendering the sound components.

2. The method of claim 1, wherein the first rotation amount is an azimuthal rotation amount and the second rotation amount is an elevational rotation amount, wherein the first axis or the second axis is perpendicular to a vector associated with the dominant sound components, or wherein the first axis or the second axis is perpendicular to the third axis.

3. The method of claim 1, further comprising determining whether to determine the rotation parameters based at least in part on a determination of a strength of the spatial direction of the dominant sound component, wherein determining the rotation parameters is responsive to determining that the strength of the spatial direction of the dominant sound component exceeds a predetermined threshold.

4. The method of claim 1, further comprising:

determining, for a second frame, a spatial direction of a dominant sound component in the second frame of the input audio signal;

determining that a strength of the spatial direction of the dominant sound component in the second frame is below a predetermined threshold; and responsive to determining that the strength of the spatial direction of the dominant sound component in the second frame is below a predetermined threshold, determining that rotation parameters for the second frame are not to be determined.

5. The method of claim 4, wherein the rotation parameters for the second frame are set to the rotation parameters for a preceding frame, or wherein the sound components of the second frame are not rotated.

6. The method of claim 1, wherein determining the rotation parameters comprises:

smoothing at least one of: the determined spatial direction of the frame with a determined spatial direction of a previous frame or the determined rotation parameters of the frame with determined rotation parameters of the previous frame.

7. The method of claim 1, wherein the direction preference of the coding scheme depends at least in part on a bit rate at which the input audio signal is to be encoded, or wherein the spatial direction of the dominant sound component is determined using a direction of arrival (DOA) analysis or a principal components analysis (PCA).

8. The method of claim 1, further comprising quantizing at least one of the rotation parameters or the indication of the spatial direction of the dominant sound component, wherein the sound components are rotated using the quantized rotation parameters or the quantized indication of the spatial direction of the dominant sound component.

9. The method of claim 8, wherein quantizing the rotation parameters or the indication of the spatial direction of the dominant sound component comprises encoding a numerical value corresponding to a point of a set of points uniformly distributed on a portion of a sphere, or further comprising smoothing the rotation parameters relative to rotation parameters associated with a previous frame of the input audio signal prior to quantizing the rotation parameters or prior to quantizing the indication of the spatial direction of the dominant sound component.

10. The method of claim 1, further comprising smoothing a covariance matrix used to determine the spatial direction of the dominant sound component of the frame relative to a covariance matrix used to determine a spatial direction of a dominant sound component of a previous frame of the input audio signal.

11. The method of claim 1, wherein determining the rotation parameters comprises determining one or more rotation angles subject to a limit determined based at least in part on a rotation applied to a previous frame of the input audio signal.

12. The method of claim 11, wherein the limit indicates a maximum rotation from an orientation of the dominant sound component based on the rotation applied to the previous frame of the input audio signal.

13. The method of claim 1, wherein rotating the sound components comprises interpolating from previous rotation parameters associated with a previous frame of the input audio signal to the determined rotation parameters for samples of the frame of the input audio signal.

14. The method of claim 13, wherein the interpolation comprises a linear interpolation, or wherein the interpolation comprises applying a faster rotation to samples at a beginning portion of the frame relative to samples at an ending portion of the frame.

15. An apparatus configured for implementing the method of claim 1.

16. A method for decoding scene-based audio, comprising:

receiving, by a decoder, information representing rotated audio components of a frame of an audio signal and a parameterization of rotation parameters used to generate the rotated audio components, wherein the rotated audio components were rotated, by an encoder, from an original orientation, and wherein the rotated audio components have been rotated to a rotated orientation that aligns with a direction preference of a coding scheme used by the encoder and the decoder, wherein the direction preference of the coding scheme corresponds to the direction of a direction dependent component in an audio signal that is waveform encoded;

decoding the received information based at least in part on the coding scheme;

reversing a rotation of the audio components based at least in part on the parameterization of the rotation parameters to recover the original orientation, wherein reversing the rotation of the audio components comprises rotating the audio components around a first axis by a first rotation amount and around a second axis by a second rotation amount, and wherein the first rotation amount and the second rotation amount are indicated in the parameterization of the rotation parameters; and rendering the audio components at least partly subject to the recovered original orientation.

17. The method of claim 16, wherein the first rotation amount is an azimuthal rotation amount and the second rotation amount is an elevational rotation amount, wherein the first axis or the second axis is perpendicular to a vector associated with a dominant sound component of the audio components, wherein the first axis or the second axis is perpendicular to a third axis that is associated with the direction preference of the coding scheme.

18. The method of claim 16, wherein reversing the rotation of the audio components comprises rotating the audio components around an axis perpendicular to a plane formed by a dominant sound component of the audio components prior to the rotation and an axis corresponding to the direction preference of the coding scheme, and wherein information indicating the axis perpendicular to the plane is included in the parameterization of the rotation parameters.

19. One or more non-transitory media having software stored thereon, the software including instructions for controlling one or more devices to perform the method of claim 16.

20. A method for encoding scene-based audio, comprising:

determining, by an encoder, a spatial direction of a dominant sound component in a frame of an input audio signal;

determining, by the encoder, rotation parameters based on the determined spatial direction and a direction preference of a coding scheme to be used to encode the input audio signal, wherein the direction preference of the coding scheme corresponds to the direction of a direction dependent component in an audio signal that is waveform encoded;

modifying the direction preference of the coding scheme to generate an adapted coding scheme, wherein the modified direction preference is determined based on the rotation parameters or the determined spatial direction of the dominant sound component such that the spatial direction of the dominant sound component is aligned with the modified direction preference of the adapted coding scheme, wherein modifying the direction preference of the coding scheme comprises:

determining a first rotation amount and a second rotation amount for the direction preference of the coding scheme based on the spatial direction of the dominant sound component and the direction preference of the coding scheme; and rotating the direction preference of the coding scheme around a first axis by the first rotation amount and around a second axis by said second rotation amount such that the spatial direction of the dominant sound component, after rotation, is aligned with the modified direction preference of the adapted coding scheme; and encoding sound components of the frame of the input audio signal using the adapted coding scheme in connection with an indication of the modified direction preference.

21. A method for decoding scene-based audio, comprising:

receiving, by a decoder, information representing audio components of a frame of an audio signal and an indication of an adaptation of a coding scheme by an encoder to encode the audio components, wherein the coding scheme was adapted by the encoder such that a spatial direction of a dominant sound component of the audio components and a direction preference of the coding scheme are aligned, wherein the direction preference of the coding scheme corresponds to the direction of a direction dependent component in an audio signal that is waveform encoded;

adapting the decoder based on the indication of the adaptation of the coding scheme, wherein adapting the decoder comprises rotating the direction preference of the coding scheme around a first axis by a first rotation amount and around a second axis by a second rotation amount, and wherein the first rotation amount and the second rotation amount are indicated in the indication of the adaptation of the coding scheme; and decoding the audio components of the frame of the audio signal using the adapted decoder.

* * * * *